(12) United States Patent
Uenosono et al.

(10) Patent No.: US 7,241,050 B2
(45) Date of Patent: Jul. 10, 2007

(54) HYDRODYNAMIC BEARING DEVICE

(75) Inventors: Kaoru Uenosono, Ozu (JP); Yosei Yoshikawa, Touon (JP); Akira Sakata, Naruto (JP); Takafumi Asada, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 187 days.

(21) Appl. No.: 11/189,827

(22) Filed: Jul. 27, 2005

(65) Prior Publication Data

US 2006/0023982 A1 Feb. 2, 2006

(30) Foreign Application Priority Data

| Jul. 29, 2004 | (JP) | ............... 2004-222514 |
| Dec. 9, 2004 | (JP) | ............... 2004-356110 |

(51) Int. Cl.
    *F16C 32/06* (2006.01)
(52) U.S. Cl. .................................................. 384/107
(58) Field of Classification Search ................ 384/100, 384/107; 310/90; 360/99.08, 98.07
    See application file for complete search history.

(56) References Cited

U.S. PATENT DOCUMENTS

| 4,254,961 | A | * | 3/1981 | Fersht et al. ................ 384/100 |
| 5,112,141 | A | * | 5/1992 | Asada et al. ................ 384/100 |
| 5,715,116 | A | * | 2/1998 | Moritan et al. .......... 360/99.08 |
| 7,095,147 | B2 | * | 8/2006 | Aiello et al. .................. 310/90 |
| 2006/0126979 | A1 | * | 6/2006 | Uenosono et al. .......... 384/100 |
| 2006/0133704 | A1 | * | 6/2006 | Uenosono et al. .......... 384/107 |

FOREIGN PATENT DOCUMENTS

JP          11082486          3/1999

* cited by examiner

*Primary Examiner*—Thomas R. Hannon
(74) *Attorney, Agent, or Firm*—Steptoe & Johnson LLP

(57) ABSTRACT

A hydrodynamic bearing device in which an introducing minimum clearance for causing capillary phenomenon is formed from the location in the proximity of the opening of a communicating path to the open end of the bearing hole in between the cover and the end face on the open end of the sleeve so that the operating fluid from the communicating path in the sleeve flows into the bearing hole by the capillary phenomenon; a vent hole leading to the outside air is formed on the cover; a fluid storage space for storing the operating fluid is formed on the inside surface of the cover or the end face on the open end of the sleeve to communicate the introducing minimum clearance and the vent hole in the circumferential direction; and the air bubbles separated at the fluid storage space are exhausted outward from the vent hole.

15 Claims, 15 Drawing Sheets

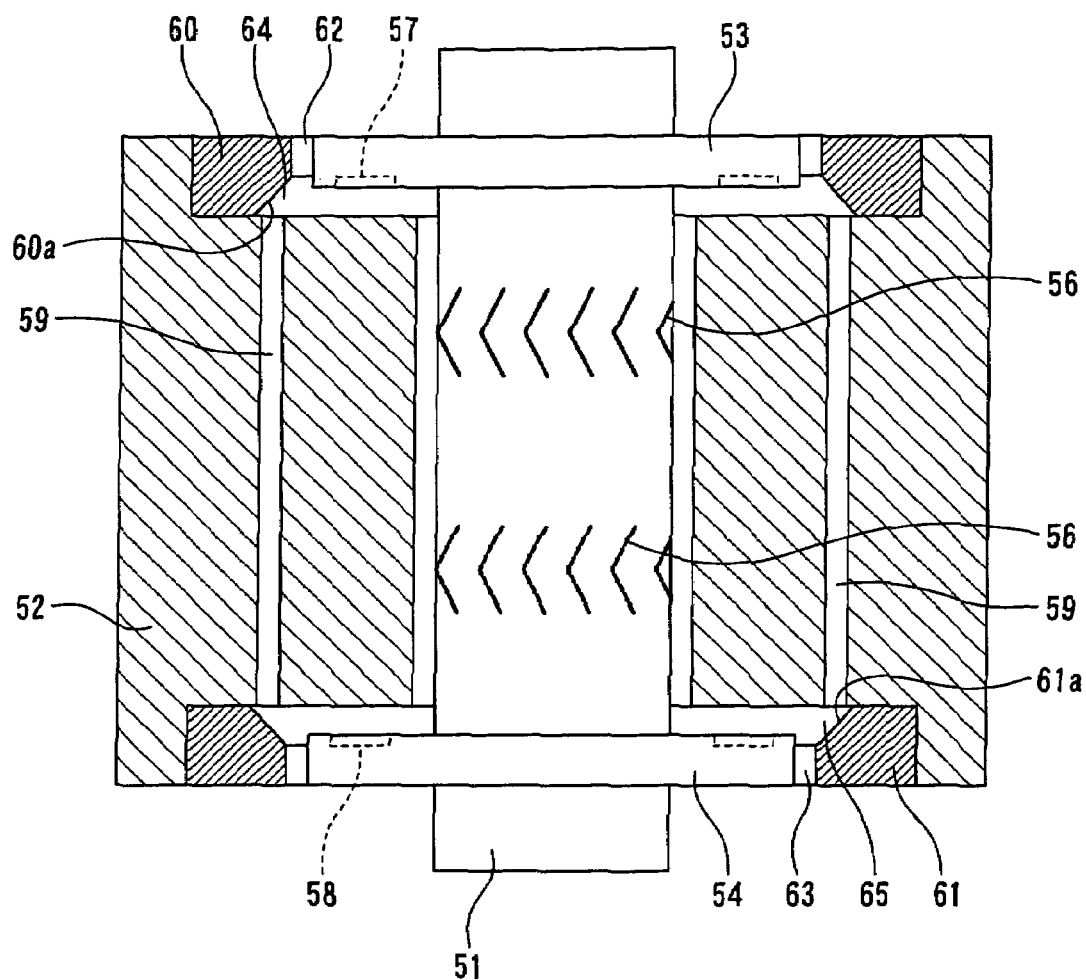

HYDRODYNAMIC BEARING DEVICE

FIELD OF THE INVENTION

The invention relates to a hydrodynamic bearing device used in a spindle motor and the like for rotatably driving a magnetic disc, an optical disc and the like.

DESCRIPTION OF THE RELATED ART

Instead of a ball bearing device conventionally used, a hydrodynamic bearing device excelling in rotating precision and silence than the ball bearing is widely adopted for the bearing device used in the spindle motor and the like of a hard disk drive.

This type of hydrodynamic bearing device includes a hydrodynamic bearing device disclosed in, for example, JP-A 11-82486 (1999). As shown in FIG. 18, the hydrodynamic bearing device includes a shaft 51, a sleeve 52 arranged on the outer periphery of the shaft 51 with a gap in between, and thrust flanges 53 and 54 of thick diameter arranged on both ends of the shaft 51 and arranged in an orientation that includes a gap with respect to both end faces of the sleeve 52. An operating fluid consisting of lubricant oil is filled into the gap between the outer peripheral surface of the shaft 51 and the inner peripheral surface of the sleeve 52, and the gap between the surface on the inner side of the thrust flanges 53 and 54 (lower surface of the thrust flange 53 and the upper surface of the thrust flange 54) and both end faces of the sleeve 52 facing the respective surface of the flange. A dynamic pressure generating groove 56 is formed on the outer peripheral surface of the shaft 51 and a radial hydrodynamic bearing is configured in which, when the shaft 51 and the sleeve 52 are relatively rotated by the motor rotational driving force not shown, the shaft 51 and the sleeve 52 are supported in a freely rotating manner through a predetermined gap in a radial direction (direction of radius) by the pressure of the operating fluid collected by the dynamic pressure generating groove 56. The dynamic pressure generating grooves 57 and 58 are formed on the surface on the inner side of the thrust flanges 53 and 54 and a thrust hydrodynamic bearing is configured in which, when the thrust flanges 53 and 54 attached to the shaft 51 and the sleeve 52 are relatively rotated by the motor rotational driving force, the shaft 51 and the sleeve 52 are supported in a freely rotating manner through a predetermined gap in a thrust direction (direction of bearing axis) by the pressure of the operating fluid collected by the dynamic pressure generating grooves 57 and 58.

In this hydrodynamic bearing device, a plurality of communicating paths 59 extending parallel to the bearing axis are formed at an intermediate location between the inner peripheral surface and the outer peripheral surface of the sleeve 52 at every appropriate angle (e.g., 180°) with the bearing axis as the center. A space between the surface on the inner side of the thrust flanges 53 and 54 and both end faces of the sleeve 52 facing the respective surface of the flange is communicated by the communicating paths 59. Fluid closing members 60 and 61 are fitted to the inner peripheral part of both ends of the sleeve 52 so as to face the outer peripheral surface of the thrust flanges 53 and 54 across a clearance. Inclined surfaces 60a and 61a of conical shape are formed at the location of the fluid closing members 60 and 61 facing the communicating paths 59, and the locations facing the inclined surfaces 60a and 61a are the fluid storage spaces 64 and 65 where the operating fluid is stored. The clearance is formed between the outer peripheral surface of the thrust flanges 53 and 54 and the inner peripheral surfaces of the fluid closing members 60 and 61 and is communicated to the outside air (atmospheric pressure). Fluid sealing parts 62 and 63 for sealing the operating fluid on the internal side of the hydrodynamic bearing device are also arranged using the surface tension of the operating fluid.

Therefore, the configuration given above is such in which even when the pressure of the operating fluid becomes uneven at the space between the outer peripheral surface of the shaft 51 formed with the radial hydrodynamic bearing and the inner peripheral surface of the sleeve 52, and the space between the surface on the inner side of the thrust flanges 53 and 54 formed with the thrust hydrodynamic bearing and both end faces of the sleeve 52 facing the respective surface of the flange due to formation of the communicating paths 59 and creation of a pressure difference, such pressure difference is resolved. That is, even if the pressure of the operating fluid becomes uneven by arranging the communicating paths 59, adjustment is made to eliminate the pressure difference between the operating fluids to stabilize the bearing function or to prevent the operating fluid from jumping outward.

In the general hydrodynamic bearing device of this type, the clearance where the radial hydrodynamic bearing is formed or the clearance where the thrust hydrodynamic bearing is formed is extremely small, and thus the work of assembling the hydrodynamic bearing device and then filling the operating fluid into the hydrodynamic bearing includes filling the operating fluid to the inner part of the hydrodynamic bearing device so that the fluid is satisfactorily filled to the inner part. Even so, however, one part of air sometimes remains in the space between the outer peripheral surface of the shaft 51 formed with the radial hydrodynamic bearing and the inner peripheral surface of the sleeve 52, and the space between the surface on the inner side of the thrust flanges 53 and 54 formed with the thrust hydrodynamic bearing and both end faces of the sleeve 52 facing the respective surface of the flange. Further, rotation of the hydrodynamic bearing device may involve and mix small air bubbles in the operating fluid. Therefore, when the air enters the inner part as air bubbles and attaches to the dynamic pressure generating groove 56 of the radial hydrodynamic bearing or the dynamic pressure generating grooves 57 and 58 of the thrust hydrodynamic bearing, the feeding amount of the operating fluid by the dynamic pressure generating grooves 56, 57 and 58 decreases, thus lowering the bearing performance such as, lower bearing stiffness due to air bubbles, and instability of rotation during rotating operation.

In this conventional type of hydrodynamic bearing device, the fluid from where air (air bubble) is removed in advance is used in filling of the fluid in the assembly step, but complete removal of air is difficult. Further, as air is involved during rotation, air bubbles are sometimes produced in the fluid. A means for removing the air bubbles do not conventionally exist, and thus the air bubbles attached to the dynamic pressure generating groove remain at the dynamic pressure generating groove or in the proximity thereof.

SUMMARY OF THE INVENTION

The invention aims to provide a hydrodynamic bearing device in which the bearing performance is satisfactorily maintained in a stable state over a long period of time by circulating the operating fluid through the hydrodynamic bearing and efficiently removing the air bubbles in the operating fluid during the operation of the hydrodynamic bearing device without the operating fluid leaking outward or involving sudden fluctuation.

The invention relates to a hydrodynamic bearing device comprising a shaft, a sleeve having a bearing hole with an open end that is opened and a close end that is closed, the shaft being inserted to the bearing hole of freely rotating via a predetermined gap, and a cover for covering an end face on the open end of the sleeve with a space in between. A radial dynamic pressure generating groove for supporting the shaft with respect to the sleeve in a non-contacting relatively freely rotating manner in a radial direction is formed on at least one of an outer peripheral surface of the shaft or an inner peripheral surface of the sleeve where the shaft and the sleeve face each other, a communicating path for communicating a space region on the close end face of the sleeve and a space region between the cover and the end face on the open end of the sleeve is formed in the sleeve, an operating fluid is filled into a space in the sleeve including a space between the cover and the sleeve, and when the shaft is relatively rotated with respect to the sleeve, the operating fluid is circulated through a space between the shaft and the sleeve, the space region on the close end side leading to the space between the shaft and the sleeve, the communicating path leading to the space region on the close end, and a space between the cover and the sleeve leading to the communicating path. The hydrodynamic bearing device is characterized in that an introducing minimum clearance for causing capillary phenomenon is formed to the open end of the bearing hole from a location in the proximity of the opening of the communicating path between the cover and the end face on the open end of the sleeve so that the operating fluid from the communicating path flows into the bearing hole by the capillary phenomenon, a vent hole leading to outside air is formed at a location including no introducing minimum clearance of the cover in the space region between the cover and the end face on the open end of the sleeve, and a fluid storage space for storing the operating fluid is formed by being depressed so as to become a space larger than the clearance of the introducing minimum clearance at the inside surface of the cover facing the end face on the open end of the sleeve or at the end face on the open end of the sleeve thereby to communicate the introducing minimum clearance and the vent hole in the circumferential direction.

In the above configuration, even when one of the shaft and the sleeve is relatively rotated causing the operating fluid to circulate and flow through the inner part of the sleeve and the space between the sleeve and the cover and the air bubbles to attach to the dynamic pressure generating grooves and the like of the radial hydrodynamic bearing, the air bubbles break away from the dynamic pressure generating groove and circulate by the circulation flow, and when flowing into the fluid storage space from the communicating path through the introducing minimum clearance, the air bubbles are separated from the operating fluid and exhausted through the vent hole. Thus, lowering of bearing function such as, lowering of bearing stiffness due to air bubbles and instability of rotation during rotating operation is prevented.

One aspect of the invention is that the fluid storage space is formed into a shape that inclines with respect to the circumferential direction so that a separating distance from the end face on the open end of the sleeve becomes larger from the introducing minimum clearance toward the vent hole side. According to such configuration, even when the hydrodynamic bearing device is subjected to an external impact or the orientation is suddenly changed, the interface between the air and the operating fluid in the fluid storage space remains in the proximity of the vent hole and is prevented from moving in the circumferential direction. Thus, leaking of the operating fluid to the outside involved in the movement of the air bubbles can be prevented. Further, at the location in the proximity of the vent hole, the interface has a shape that changes in the circumferential direction, and thus fluctuation of the area of the interface or the surface tension involved therewith is small.

A further aspect of the invention is that a bearing hole outer periphery minimum clearance for causing capillary phenomenon is also formed on the outer periphery in the proximity of the open end of the bearing hole between the inside surface of the cover and the end face on the open end of the sleeve, the introducing minimum clearance is connected to the bearing hole outer periphery minimum clearance, and the operating fluid sent out from the communicating path flows into the bearing hole by the capillary phenomenon via the introducing minimum clearance and the bearing hole outer periphery minimum clearance. According to such configuration, the operating fluid introduced by the introducing minimum clearance is satisfactorily supplied from the entire circumference to the open end of the bearing hole of the sleeve through the bearing hole outer periphery minimum clearance, and the open end of the bearing hole of the sleeve is stably filled with the operating fluid.

A still further aspect of the invention is that an operating fluid storing part for storing the operating fluid in communication with the outside air is formed on the inner peripheral surface facing the shaft of the cover, the operating fluid storing part including an inclined surface that inclines so that an inner diameter of the cover becomes larger as the distance from the end face on the open end of the sleeve becomes larger, and the inner diameter of the operating fluid storing part is formed into a shape in which a surface tension of the operating fluid stored in the operating fluid storing part and a surface tension of the operating fluid facing the vent hole are substantially balanced. According to such configuration, a sudden change in the position of the interface and the leakage of the operating fluid caused by such change in interface can be prevented.

Another aspect of the invention is that an operating fluid storing part for storing the operating fluid in communication with the outside air is formed on the outer peripheral surface of the shaft facing the inner peripheral surface of the cover, the operating fluid storing part including an inclined surface that inclines so that an outer diameter of the shaft becomes smaller as the distance from the end face on the open end side of the sleeve becomes larger, and the operating fluid storing part is formed into a shape in which a surface tension of the operating fluid stored in the operating fluid storing part and a surface tension of the operating fluid facing the vent hole are substantially balanced. According to such configuration, in addition to the sealing effect by the surface tension in a stationary state, a sealing effect by a centrifugal force generated through shaft rotation during the operation is also provided, thereby preventing a sudden change in the position of the interface and the leakage of the operating fluid caused by such change in interface.

Another aspect of the invention is that an operating fluid storing part for storing the operating fluid in communication with the outside air is formed on the inner peripheral surface facing the shaft of the cover, the operating fluid storing part being formed so as to be inclined with the inner diameter of the cover becoming larger and the outer diameter of the shaft becoming smaller as the distance from the end face on the open end side of the sleeve becomes larger, and having at least one part of the inclined surface formed on the outer peripheral surface of the shaft facing a range of thickness in the axial direction of the cover.

Another aspect of the invention is that the space region on the close end face of the sleeve is a space region where a thrust flange fixed to a distal end of the shaft is arranged, and the opening of the communicating path arranged on the close end face of the sleeve is connected to the space where the thrust flange is arranged.

Another aspect of the invention is that the space region on the close end face of the sleeve is a space region formed by a distal end of the shaft and a close end face region close plate, and the opening of the communicating path arranged on the close end face of the sleeve is connected to the space where the distal end of the shaft faces.

Further, in the invention, the radial dynamic pressure generating groove is formed into a shape that applies circulating force to the operating fluid.

According to the hydrodynamic bearing device of the invention, during the rotating operation of the shaft, the operating fluid in the dynamic pressure generating groove of the radial hydrodynamic bearing flows toward the dynamic pressure generating groove of the thrust hydrodynamic bearing, passes through the communicating path, through a narrow clearance formed between the end face on the open end of the sleeve and the cover by the capillary phenomenon, and flows back to the dynamic pressure generating groove of the radial hydrodynamic bearing. When the operating fluid flows back, the air contained as air bubbles is separated from the fluid in a fluid storage space that is also formed between the end face on the open end side of the sleeve and the cover and that is greater than the clearance, and only the air is released outside from the vent hole. Thus, the air in the operating fluid is gradually removed. Since the operating fluid does not leak out from the vent hole, the HDD device can be prevented from being polluted. Particularly, since the fluid storage space is formed into a shape that inclines with respect to the circumferential direction so that the separating distance from the end face on the open end of the sleeve becomes larger from the introducing minimum clearance toward the vent hole, even when the hydrodynamic bearing device is subjected to an external impact or the orientation thereof is suddenly changed, the leakage of the operating fluid to the outside involved in the movement of the air bubbles can be prevented. Therefore, lowering of bearing function such as, lowering of bearing stiffness due to air bubbles and instability of the rotation during rotating operation can be prevented, and further, the operating fluid can be reliably prevented from leaking outward and thus reliability can be enhanced.

The hydrodynamic bearing device of the invention is particularly suitable as a spindle motor of a disc driving apparatus, a reel driving apparatus, a capstan driving apparatus, and a drum driving apparatus, but is not limited thereto.

BRIEF DESCRIPTION OF THE DRAWINGS

FIG. 18 is a cross sectional view of a conventional hydrodynamic bearing device.

DESCRIPTION OF THE PREFERRED EMBODIMENTS

A hydrodynamic bearing device according to the preferred embodiments of the invention will now be described based on the drawings. In the embodiments, a case in which the hydrodynamic bearing device is used in the spindle motor of the hard disk drive will be explained.

First Embodiment

Figure 1:
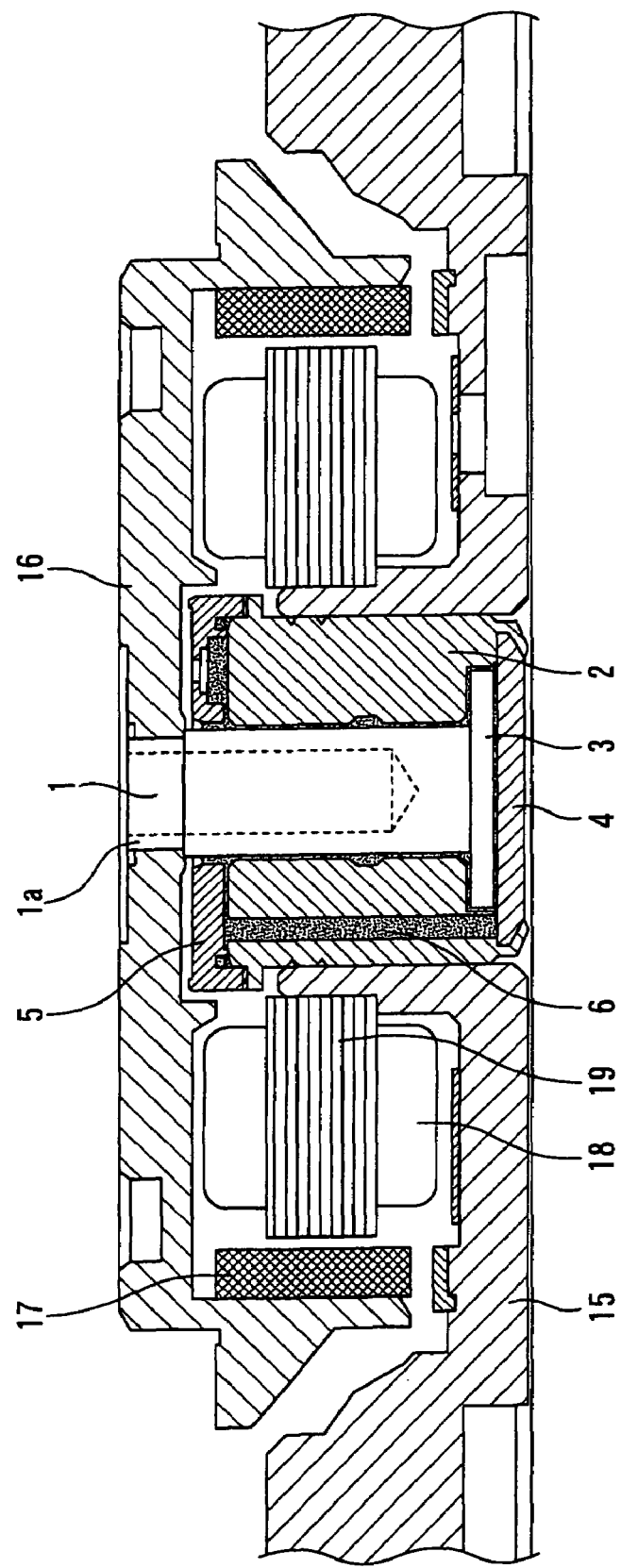
FIG. 1 is a cross sectional view of a spindle motor equipped with a hydrodynamic bearing device according to a first embodiment of the invention.
Figure 2A:
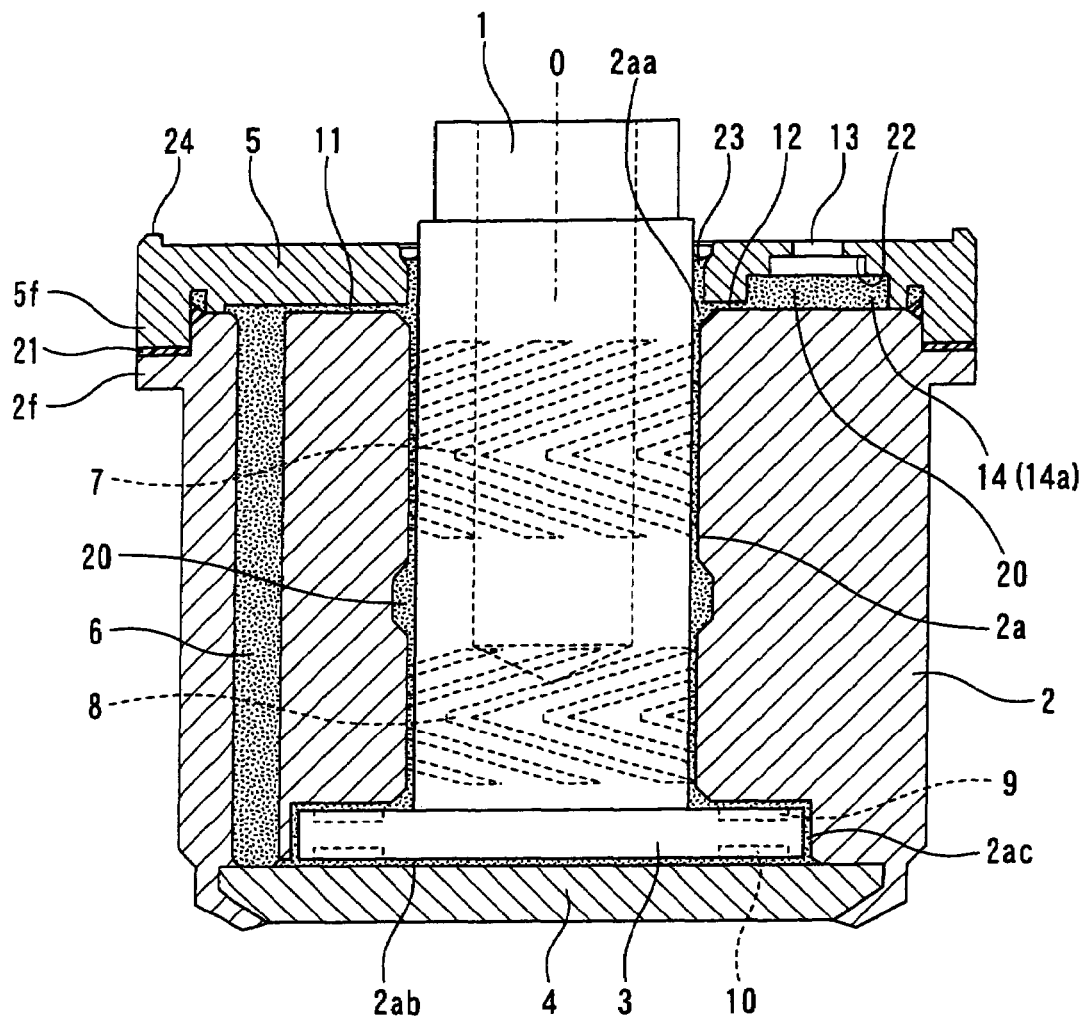
FIG. 2A is a cross sectional view of the hydrodynamic bearing device.
Figure 3:
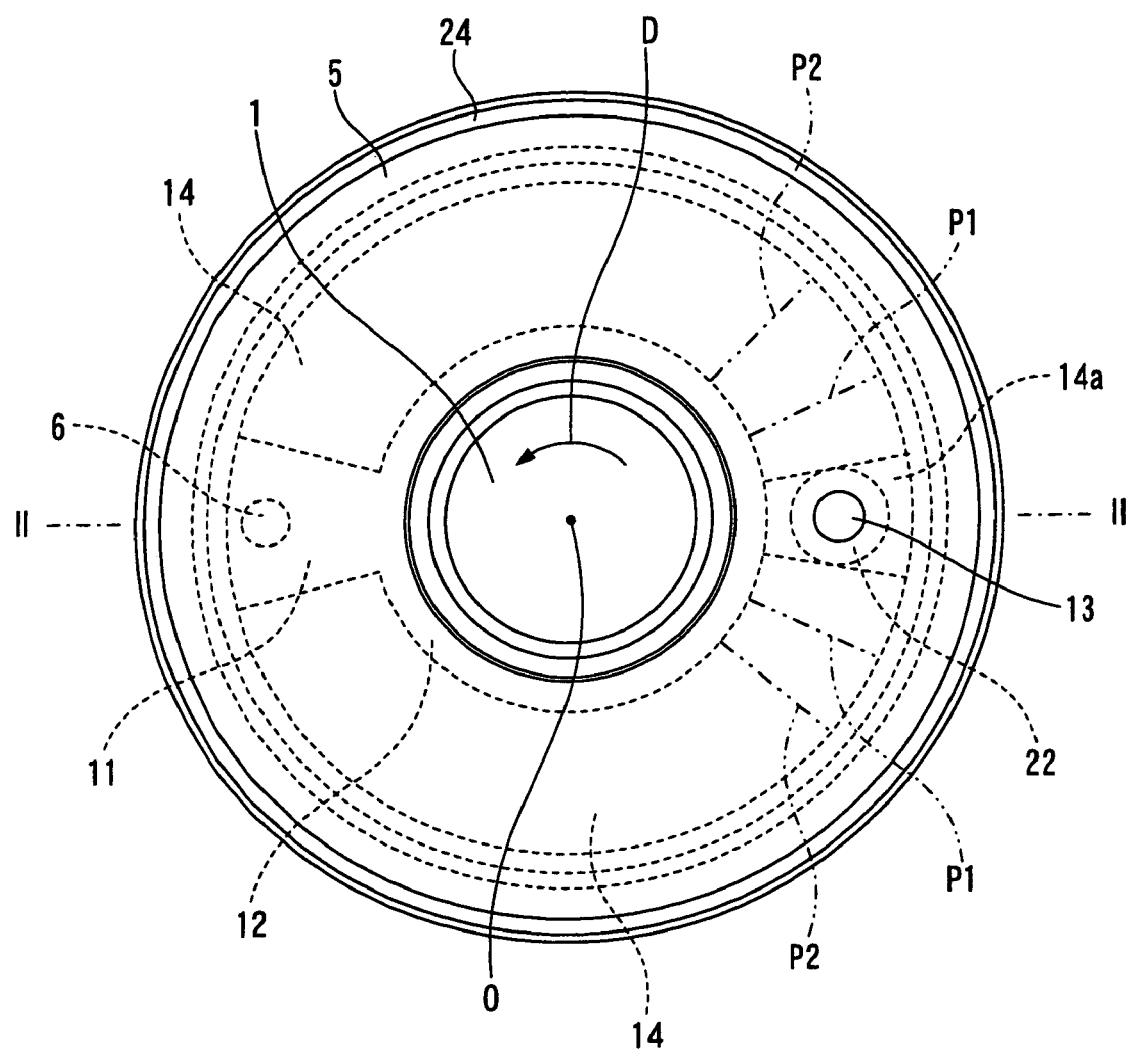
FIG. 3 is a plan view of the hydrodynamic bearing device.

FIG. 1 is a cross sectional view of a spindle motor equipped with a hydrodynamic bearing device according to a first embodiment of the invention, FIG. 2A is a cross sectional view of the hydrodynamic bearing device, FIG. 3 is a plan view of the hydrodynamic bearing device, and FIG. 2A is a cross sectional view taken along line II-II of FIG. 3. In the following description, a case in which an open end of a bearing hole of the sleeve is arranged upward and a close end is arranged downward, as shown in FIG. 1 and FIG. 2A, is explained for easy understanding, but in actual use, the arrangement is of course not limited thereto.

In FIG. 1 and FIG. 2A, the components made of the following materials are used.

A shaft 1 made of stainless steel is used, and a flange 3 made of stainless steel having hardness lower than that used for the shaft 1 is used since the flange 3 is integrally fixed to the shaft 1 and is formed with a dynamic pressure generating groove. A sleeve 2 is made of copper alloy or iron metal, and the surface is performed with nickel plating. A thrust plate 4 is made of stainless steel in which the surface is mirror polished, and is sometimes performed with DLC coating. A cover 5 is resin molded. A hub 6 is made of stainless steel or aluminum alloy excelling in machinability and out gas resistance. A magnet 17 is a neodymium-iron-boron resin magnet. A stator core 19 is made of an electromagnetic steel plate, and is wrapped with coil 18. A base plate 15 is made of surface treated aluminum alloy or iron metal. When the base plate 15 is made of aluminum alloy, an annular suction plate made of iron metal is often arranged on the base plate immediately below the magnet 17. The coil 18 is soldered to an FPC of polyimide resin, which FPC is pulled out exterior to the motor. An insulating seal of PET resin is arranged on the base plate 15 immediately below the coil to ensure insulation between the coil 18 and the base plate 15.

As shown in FIG. 1 to FIG. 3, the hydrodynamic bearing device of the spindle motor includes a shaft 1; a sleeve 2, fixed to the base 15 of the spindle motor, including a bearing hole 2a with an open end 2aa on the upper side that opens and a close end 2ab on the lower side that is closed, and having the shaft 1 inserted therein in a freely rotating fashion via a gap (space) in between; a thrust flange 3 of thick diameter fixed to the lower end part of the shaft 1 with an external fit coupling, a screw and the like, and arranged at the thick diameter hole part 2ac on the close end side of the bearing hole 2a in an orientation that includes a gap with respect to the thick diameter hole part 2ac; and a thrust plate 4 fixed at the bottom part of the sleeve 2 so as to face the lower surface of the thrust flange 3 with a gap therebetween. In addition to this configuration, the cover 5, configured by a material having translucency, for covering the upper end face (end face on open end side) of the sleeve 2 in an orientation that includes a space is arranged, which cover 5 includes one vent hole 13 leading to outside air. In the hydrodynamic bearing device, one communicating path 6 (e.g., diameter of between about 0.2 mm and 0.6 mm) extending parallel to the bearing axis O is perforated at a location closer to the outer peripheral surface of the sleeve 2. The communicating path 6 communicates the thick diameter hole part 2ac (space region on the close end face side) arranged on the close end 2ab side of the bearing hole 2a and the space region between the cover 5 and the upper end face or the end face on the open end (2aa) side of the sleeve 2.

Figure 6:
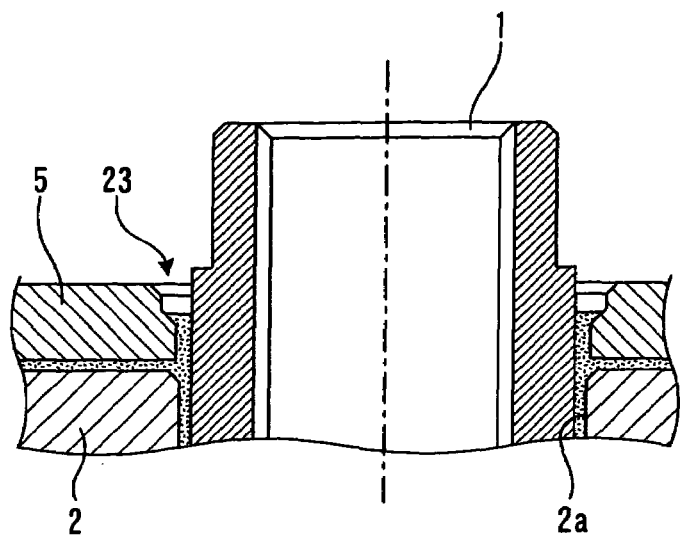
FIG. 6 is a cross sectional view of an operating fluid storing part and a location in the proximity thereof of the hydrodynamic bearing device.

The operating fluid 20 such as, lubricating oil is filled into the space of the inner part of the sleeve 2 including the space between the cover 5 and the sleeve 2 (i.e., space between the outer peripheral surface of the shaft 1 and the inner peripheral surface of the sleeve 2, space in the thick diameter hole part 2ac of the bearing hole 2a, space of the communicating locations between the thick diameter hole part 2ac of the bearing hole 2a and the communicating path 6, space within the communicating path 6, space between the upper end face of the sleeve 2 and the cover 5 (excluding location of vent hole 13)). It is to be noted that, as shown enlarged in FIG. 6 and FIG. 7A, an operating fluid storing part 23 for storing the operating fluid 20 in communication with the outside air is formed so as to widen toward the open side in the inner peripheral surface of the cover 5 facing the shaft 1. The sleeve 2 and the cover 5 are configured so that the outer peripheral collar parts 2f and 5f integrally formed with the sleeve 2 and the cover 5, respectively, are fixed to each other with an adhesive 21. The operating fluid 20 thus does not leak out to the outside from the joining surface of the sleeve 2 and the cover 5.

Figure 2B:
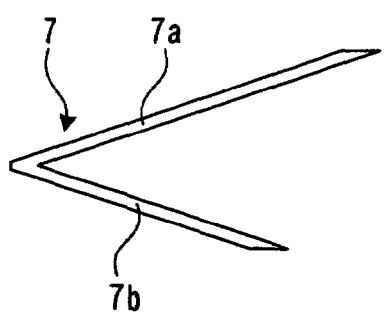
FIG. 2B is a view showing one dynamic pressure generating groove of the hydrodynamic bearing device.

Two dynamic pressure generating grooves 7 and 8 of herringbone pattern etc. are formed one above the other on the inner peripheral surface of the sleeve 2 (or outer peripheral surface of the shaft 1 or on both the inner peripheral surface of the sleeve 2 and the outer peripheral surface of the shaft 1) and the radial hydrodynamic bearing is configured in which, when the shaft 1 and the sleeve 2 are relatively rotated by the rotational driving force to be hereinafter described, the shaft 1 and the sleeve 2 are supported in a freely rotating manner through a predetermined gap in the radial direction (direction of radius) by the force of the operating fluid 20 collected by the dynamic pressure generating grooves 7 and 8. The dynamic pressure generating grooves 9 and 10 of spiral pattern etc. are formed on the upper surface and the lower surface of the thrust flange 3 (or arranged on the lower surface of the sleeve 2 or upper surface of the thrust plate 4 facing thereto, or on all of the upper and lower surfaces of the thrust flange 3, the lower surface of the sleeve 2, and the upper surface of the thrust plate 4) and the thrust hydrodynamic bearing is configured in which, when the thrust flange 3 attached to the shaft 1 and the sleeve 2 are relatively rotated by the rotational driving force, the shaft 1 and the sleeve 2 are supported in a freely rotating manner through a predetermined gap in the thrust direction (direction of bearing axis) by the force of the operating fluid 20 collected by the dynamic pressure generating grooves 9 and 10. The dynamic pressure generating grooves 7 and 8 configuring the radial hydrodynamic bearing are formed into a well-known herringbone shape, and are formed at a total of two locations on the upper side and the lower side of the outer peripheral surface of the shaft 2. The dynamic pressure generating groove 8 on the lower side has the groove inclining upward from the vertex and the groove inclining downward from the vertex made into the same length, whereas the dynamic pressure generating groove 7 on the upper side has the groove 7a inclined upward from the vertex formed longer than the groove 7b inclined downward from the vertex, as shown in FIG. 2B. During rotational drive, the operating fluid 20 of the clearance is actively sent out downward by the dynamic pressure generating groove 7 on the upper side.

As shown in FIG. 1, the hub 16 serving as a rotating member, on which outer periphery a magnetic recording disc and the like is fixed, is externally fitted to a projecting shaft part 1a of the shaft 1 projecting out from the bearing hole 2a of the sleeve 2 in a press-fit state. In the first embodiment, the rotor magnet 17 is attached to the inner periphery of the part closer to the base of the hub 16. The stator core 19 wrapped with stator coil 18 is attached to the base 15 so as to face the rotor magnet 17. The rotor magnet 17 and the stator core 19 configure the rotational driving part of the spindle motor that supplies rotational driving force to between the shaft 1 and the sleeve 2.

Figure 4A:
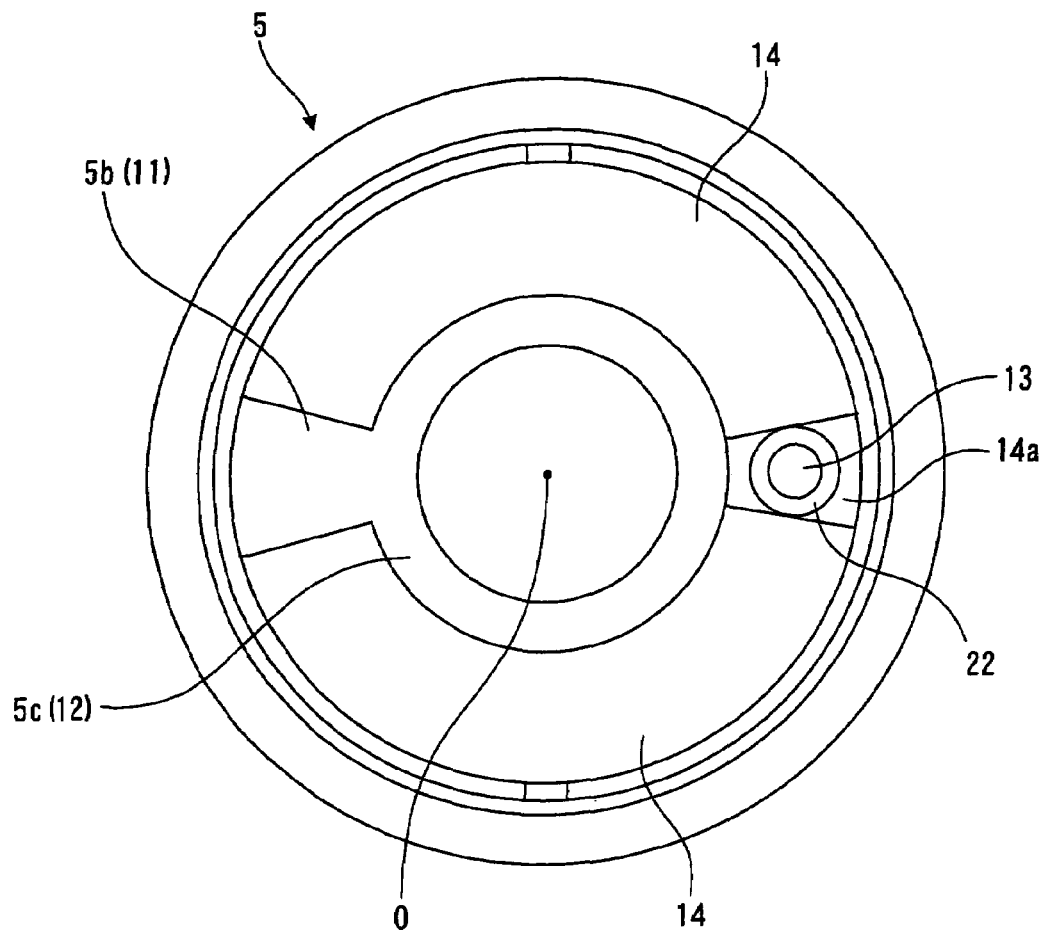
FIG. 4A is a view of a cover of the hydrodynamic bearing device seen from the inside surface.

As shown in FIG. 2A, the upper end face of the sleeve 2 facing the cover 5 is substantially planar. On the contrary, as shown in FIG. 2A and FIGS. 3 to 5 (in FIG. 5, a separating space between an inside surface part of the cover 5 and an upper end face of the sleeve 2 facing thereto is schematically shown for easy understanding), the cover 5 has an inside surface part arranged so that the region in the proximity of the opening of the communicating path 6 that opens to the upper end face of the sleeve 2 and the outer periphery part of the open end of the bearing hole 2a of the sleeve 2 have dimension b (refer to FIG. 5) in which the separating distance between the inside surface part of the cover 5 and the upper end face of the sleeve 2 facing thereto causes capillary phenomenon, and clearances that allows the fluid to flow into the bearing hole 2a of the inner peripheral surface of the sleeve 2 by the capillary phenomenon (each referred to as introducing minimum clearance 11, and bearing hole outer peripheral minimum clearance 12, and in FIG. 4A, the introducing minimum clearance surface 5b facing the introducing minimum clearance 11 of the inside surface part of the cover 5, and the bearing hole outer peripheral minimum clearance surface 5c facing the bearing hole outer periphery minimum clearance 12 are shown) are formed. The introducing minimum clearance 11, as shown in FIG. 3 and FIG. 4A, is formed so as to continue from the location in the proximity of the opening of the communicating path 6 to the open end of the bearing hole 2a of the sleeve 2 by way of the bearing hole outer periphery minimum clearance 12. In the first embodiment, the introducing minimum clearance 11 has a substantial fan shape with an opening angle of about 30°, and is formed over a region wider than the opening of the communicating path 6. In the region of the introducing minimum clearance 11, it is normal to form the clearance to have a uniform interval, however, the interval of the clearance may become smaller gradually from the location in a proximity of the opening of the communicating path toward the open end of the bearing hole. The diameter of the open end of the bearing hole 2a of the upper end face of the sleeve 2 is for example, between 2.8 mm and 3.2 mm, and the bearing hole outer periphery minimum clearance surface 5c is a toric shape formed with a dimension of the width in the radius direction of between 0.2 to 0.6 mm from the outer periphery of the open end of the bearing hole 2a. The separating clearance between the introducing minimum clearance 11 and the bearing hole outer periphery minimum clearance 12 is for example, between 0.03 mm and 0.15 mm. In the first embodiment, the separating clearance between the introducing minimum clearance 11 and the bearing hole outer periphery minimum clearance 12 is constant with respect to the radial direction.

Particularly, the locations other than the introducing minimum clearance 11 and the bearing hole outer periphery minimum clearance 12 on the inside surface of the cover 5 is depressed so as to become a space larger than the clearances of the introducing minimum clearance 11 and the bearing hole outer periphery minimum clearance 12 to form a fluid storage space 14 that stores the operating fluid 20 so as to communicate the introducing minimum clearance 11 and the vent hole 13 in the circumferential direction. The fluid storage space 14 has for example, an inner diameter of between 3.2 mm and 3.8 mm, an outer diameter of between 5.5 mm and 6.3 mm, a minimum clearance of between 0.03 mm and 0.15 mm, and a maximum clearance of between about 0.2 mm and 0.3 mm. The vent hole 13 has the diameter of between about 0.2 mm and 1.0 mm and the like, and a concave part 22 (e.g., diameter of between 0.6 mm and 1.0 mm, depth of between about 0.1 mm and 0.3 mm) serving as a buffer space formed by a spot faced hole is formed at the location where the vent hole 13 is arranged. However, the location of the fluid storage space 14 (referred to as maximum space 14a) that continues into the vent hole 13 and the concave part 22 is formed into a shape inclined with respect to the circumferential direction so that the separating distance with respect to the upper end face of the sleeve 2 becomes the largest, and the separating distance from the upper end face (end face on the open end side) of the sleeve 2 becomes larger toward the maximum space 14a from the introducing minimum clearance 11. In the first embodiment, the separating clearance of the fluid storage space 14 is constant with respect to the radial direction. Further, in the first embodiment, the vent hole 13 communicating to the outside air is arranged at a location of the cover 5 opposite the opening of the communicating path 6 with the bearing axis O as the center when seen in planar. D in FIG. 3 is the rotating direction of the shaft 1. By forming the concave part 22 in the vent hole 13, even if rise in temperature and the like of the installing environment of the hydrodynamic bearing device occurs with the operating fluid 20 filled to its fullest, the interface K of the operating fluid 20 stays within the concave part 22, and thus the operating fluid 20 does not leak out from the vent hole 13.

As shown as an enlarged view in FIG. 7A, the operating fluid storing part 23 formed so as to become wider toward the open side at the inner peripheral surface of the cover 5 facing the shaft 1 includes an inclined surface 23a inclined so as to narrow downward, and as hereinafter described, the diameter Dt of the upper end and the diameter dt of the lower end of the inclined surface 23a are set so that even when the position of the interface at the location of the fluid storage space 14 is changed by reduction of the operating fluid through evaporation and the like, the interface is balanced within a moving range in the inclined surface 23a of the operating fluid storing part 23.

Figure 7A:
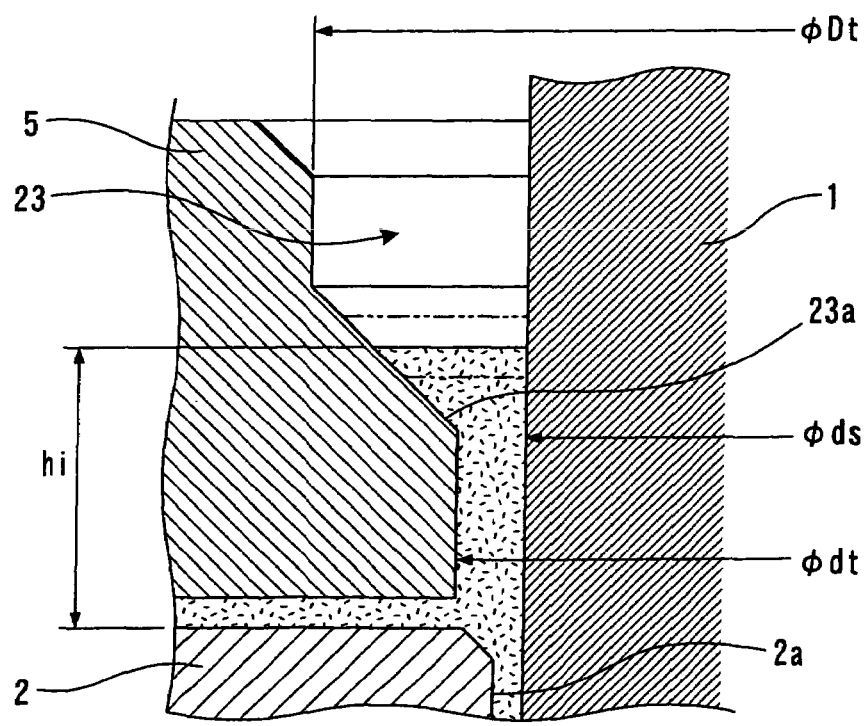
FIGS. 7A to 7C are enlarged cross sectional views of the operating fluid storing part of the hydrodynamic bearing device.
Figure 7B:
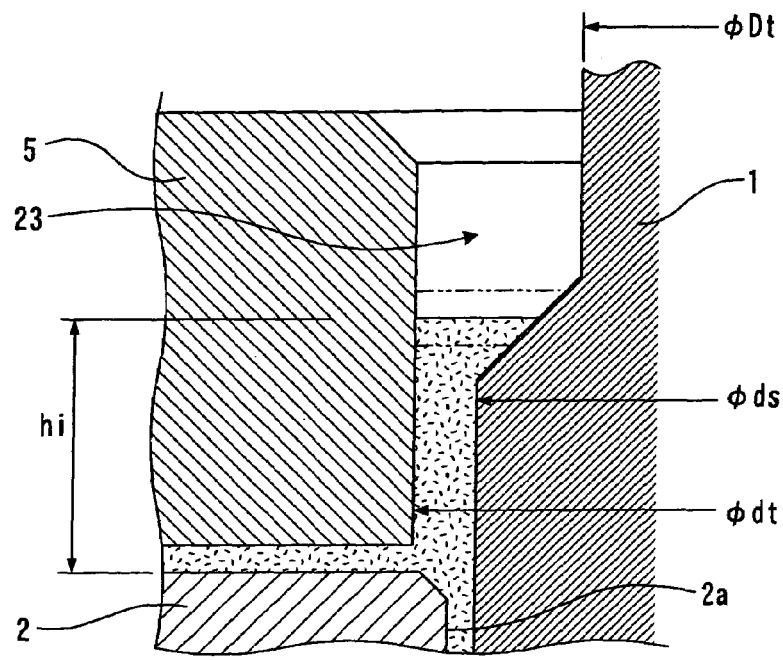

In FIG. 7A, the inclined surface is provided on the cover side, but the inclined surface may also be arranged on the shaft side as shown in FIG. 7B. In this case, other than the sealing effect by the surface tension in a stationary state, the sealing effect by centrifugal force generated through the shaft rotation in an operating state is also provided.

Figure 7C:
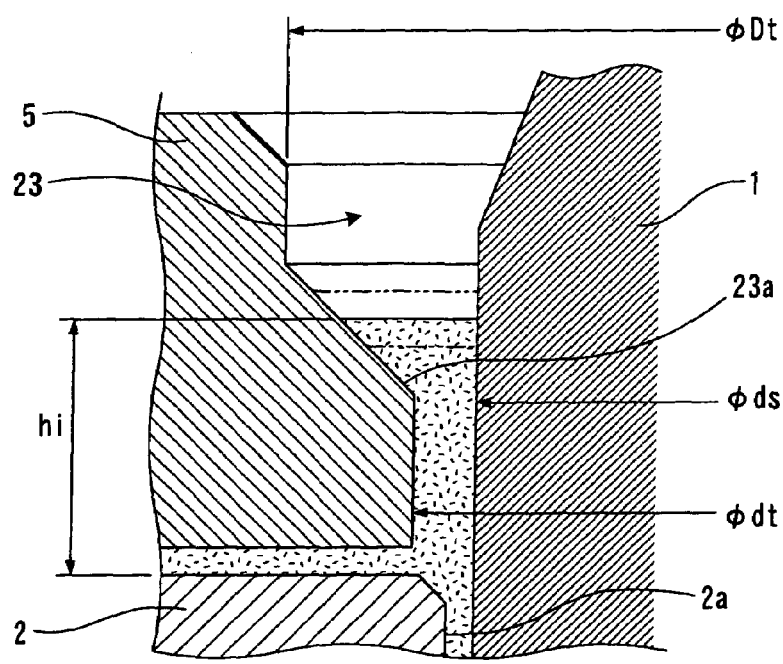

As shown in FIG. 7C, by arranging the inclined surface on the cover side, and by facing the same to at least one part of the inclined surface of the shaft 1 within a range of the thickness in the axial direction of the cover 5, the oil leakage can be prevented with both sealing by surface tension and sealing by centrifugal force when the fluid level changes.

As shown in FIG. 2A and FIG. 3, a protruding part 24 that protrudes upward is formed on the outer periphery part of the upper surface of the cover 5 to prevent the operating fluid 20 from falling outward when lubricating the operating fluid 20 after assembling the hydrodynamic bearing device. The protruding part 24 has for example, an inner diameter of between 6 mm and 8 mm and a height of between about 0.03 mm and 0.1 mm.

In the above configuration, when the shaft 1 and the sleeve 2 are relatively rotated by the rotational driving force of the spindle motor, the shaft 1 is supported with respect to the sleeve 2 with a predetermined gap in between by the force of the operating fluid 20 collected by the dynamic pressure generating grooves 7 and 8 of the radial hydrodynamic bearing and the force of the operating fluid 20 collected by the dynamic pressure generating grooves 9 and 10 of the thrust hydrodynamic bearing. Further, the operating fluid 20 between the shaft 1 and the sleeve 2 is fed downward by the force of the operating fluid 20 collected at the dynamic pressure generating groove 7 on the upper side of the radial hydrodynamic bearing, and accompanied therewith, the operating fluid 20 passes through the space between the thrust flange 3 and the sleeve 2, the space between the sleeve 2 and the thrust plate 4, the space within the communicating path 6, the introducing minimum clearance 11 and the bearing hole outer periphery minimum clearance 12 in such order, and again flows into the space between the shaft 1 and the sleeve 2, and the operating fluid 20 is actively circulated through these spaces. One part of the operating fluid 20 introduced from the communicating path 6 to the introducing minimum clearance 11 again flows into the space between the shaft 1 and the sleeve 2 through the bearing hole outer periphery minimum clearance 12 while also flowing into the fluid storage space 14.

Therefore, even when air bubbles are attached to the dynamic pressure generating grooves 7 and 8 of the radial hydrodynamic bearing or the dynamic pressure generating grooves 9 and 10 of the thrust hydrodynamic bearing, the air bubbles break away from the dynamic pressure generating grooves 7 and 8 and the dynamic pressure generating grooves 9 and 10 and circulate with the circulation flow, and flow into the fluid storage space 14 of lower pressure when passing from the communicating path 6 to the introducing minimum clearance 11. When flowing into the fluid storage space 14 of lower pressure, the size of the air bubbles becomes rather large and thus is less likely to reenter the introducing minimum clearance 11 and the bearing hole outer periphery minimum clearance 12 of high pressure, and thus the air bubbles are separated from the operating fluid 20 at the fluid storage space 14 and exhausted from the vent hole 13.

According to such configuration, the air bubbles in the operating fluid are exhausted during a normal rotational drive, and as a result, lowering of bearing performance such as, lowering of bearing stiffness due to air bubbles and instability of the rotation during rotating operation can be prevented, and thus the reliability can be enhanced.

Further, according to such hydrodynamic bearing device, not only is the operating fluid storing part 23 arranged on the inner peripheral surface of the cover 5 facing the shaft 1, but the fluid storage space 14 of large volume is also arranged between the sleeve 2 and the cover 5. Therefore, even if the operating fluid of the fluid storage space 14 decreases, the circulating function can be maintained as long as the introducing minimum clearance 11 and the bearing hole outer periphery minimum clearance 12 are filled with the operating fluid 20.

According to the invention, in particular, the fluid storage space 14 is formed into an inclined shape with respect to the circumferential direction so that the separating distance from the upper surface or the end face on the open end side of the sleeve 2 becomes large toward the maximum space 14a where the vent hole 13 is provided from the introducing minimum clearance 11, and thus even if the hydrodynamic bearing device is subjected to an external impact or the orientation is suddenly changed, the interface between the air and the operating fluid 20 in the fluid storage space 14 remains at the location in the proximity of the vent hole 13 and is prevented from moving in the circumferential direction, and as a result, the leakage of the operating fluid 20 to the outside involved in the movement of the air bubbles is prevented. Further, the cross sectional area of the storing space of the fluid storing space is larger at locations closer to the vent hole, and as shown with positions P1 and P2 of the interface of when the operating fluid 20 is reduced in FIG. 3, is shaped so that the interface constantly changes in the circumferential direction, and thus the fluctuation of the area of the interface and the surface tension at the fluid storage space 14 accompanied therewith is small.

The bearing hole outer periphery minimum clearance 12 that causes capillary phenomenon is formed on the outer periphery part in the proximity of the open end of the bearing hole in between the inside surface of the cover 5 and the upper surface of the sleeve 2, and thus the operating fluid 20 introduced from the introducing minimum clearance 11 is satisfactorily supplied to the bearing hole 2a of the sleeve 2 from the entire circumference by way of the bearing hole outer periphery minimum clearance 12, and the bearing hole 2a of the sleeve 2 is stably filled with the operating fluid 20.

By forming the inner diameter (diameter Dt of the upper end and the diameter dt of the lower end of the inclined surface 23a) of the operating fluid storing part 23 into a shape in which the surface tension of the operating fluid 20 stored in the operating fluid storing part 23 and the surface tension of the fluid storage space 14 facing the vent hole 13 are substantially balanced, the sudden fluctuation of the position of the interface of the operating fluid 20 in the operating fluid storing part 23 and the leakage of the operating fluid due to fluctuation of the interface can be prevented.

These aspects will now be explained in detail.

Figure 8:
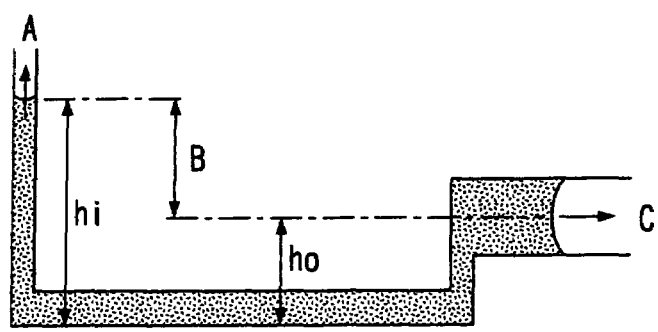
FIG. 8 is a view schematically showing the balance of the pressure between the operating fluid storing part and the fluid storage space in the hydrodynamic bearing device.

FIG. 8 is a view schematically showing the equilibrium of the pressure between the operating fluid storing part 23 and the fluid storage space 14 at the upper surface of the sleeve of the hydrodynamic bearing device. Here, A is the pressure caused by the surface tension of the interface 1 at the operating fluid storing part 23, B is the pressure by volume by the difference in the interface position, and C is the pressure caused by the surface tension of interface O at the fluid storage space 14. Further, y is the surface tension [N/m] of oil (operating fluid), $\rho$ is the density [kg/m$^3$] of the oil, Li is the contacting length between the oil interface and the member of interface I, Ai is the oil interface surface area of the interface I, Lo is the contacting length of the oil interface and the member at the interface O, Ao is the oil interface surface area of the interface O, hi is the height from the upper surface of the sleeve to the interface I, ho is the mean height (t/2) from the upper surface of the sleeve to the interface O, and $\theta$ is the contacting angle of the member and the oil interface.

In the model shown in FIG. 8, the balance equation of pressure is as follows:

$$A = B + C \, [Pa], \quad \text{(equation 1)}$$

where A, B, and C of equation 1 is as follows:

$$A = (y \cdot \cos \theta \times Li)/Ai, \quad \text{(equation 2)}$$

$$B = \rho \cdot (hi - ho), \quad \text{(equation 3) and}$$

$$C = (y \cdot \cos \theta \times Lo)/Ao. \quad \text{(equation 4)}$$

When substituting (equation 2), (equation 3) and (equation 4) to (equation 1), $$Li/Ai = \{1/(y \cdot \cos \theta)\} \times [\rho \cdot (hi - ho) + \{(y \cdot \cos \theta \times Lo)\}/Ao] \quad \text{(equation 5)}$$

is obtained, and when substituting (equation 5) to the following (equation 6) and (equation 7), and assuming the right side as Z, $$Li = \pi(ds + Dts), \quad \text{(equation 6)}$$

$$Ai = \pi\{(Dts/2)^2 - (ds/2)^2\}, \text{ and} \quad \text{(equation 7)}$$

$$(ds + Dts)/\{(Dts/2)^2 - (ds/2)^2\} = Z \quad \text{(equation 8)}$$

are obtained. When expanding (equation 8), and when deriving the diameter Dts at the operating fluid storing part 23 in accordance with the formula of solution, $$Dts=\{1+SQRT(1+Z(ds+Z\times ds^2/4))\}/(Z/2) \quad \text{(equation 9)}$$

is obtained.

By deriving the diameters Dts of when the oil interface is a maximum and a minimum from (equation 9) and setting so that the inner diameter (dt, Dt) of the top seal sufficiently satisfies the interface moving range, the surface tension of the operating fluid 20 stored at the operating fluid storing part 23 and the surface tension of the fluid storage space 14 facing the vent hole 13 become substantially balanced, thereby preventing sudden fluctuation of the position of the interface of the operating fluid 20 at the operating fluid storing part 23 and leakage of the operating fluid by the fluctuation of the interface.

In the first embodiment, the redundant oil for extending the bearing life time is accumulated in the operating fluid storage space 14, and thus only a small amount of oil is present in the operating fluid storing part 23, and has a sufficient proof force with respect to oil leakage even if the inclining angle is relatively large (e.g., 50° to 60°). Further, as the change in surface area is small even when the oil interface of the operating fluid storage space 14 is moved by consumption of oil or temperature change, the change in fluid level of the operating fluid storing part 23 is small.

In the first embodiment, the protruding part 24 that protrudes upward is formed on the outer periphery part of the upper surface of the cover 5, and thus when lubricating the operating fluid 20 after assembling the hydrodynamic bearing device, the operating fluid 20 is prevented from flowing out from the upper surface of the cover 5 by the protruding part 24. The operating efficiency is thus enhanced and the filling amount of the operating fluid 20 to the sleeve 2 is prevented from being reduced, thereby enhancing reliability.

Figure 13:
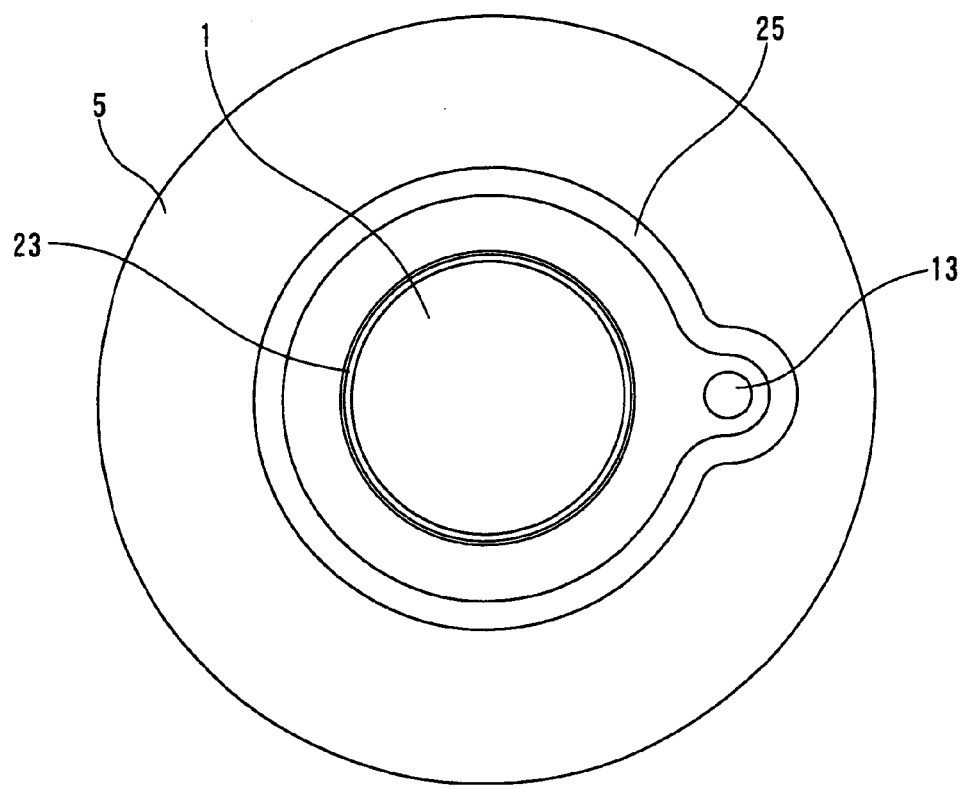
FIG. 13 is a plan view of a cover of a hydrodynamic bearing device according to another embodiment of the invention.

As shown in FIG. 13, instead of arranging the protruding part 24, an oil repellent groove 25 for applying the oil repellent agent may be formed so as to surround the operating fluid storing part 23 and the vent hole 13 from the outer side when seen planar to apply the oil repellent agent to the oil repellent groove 25 and prevent the operating fluid 20 from leaking to the outer side when supplying the operating fluid 20.

Figure 9:
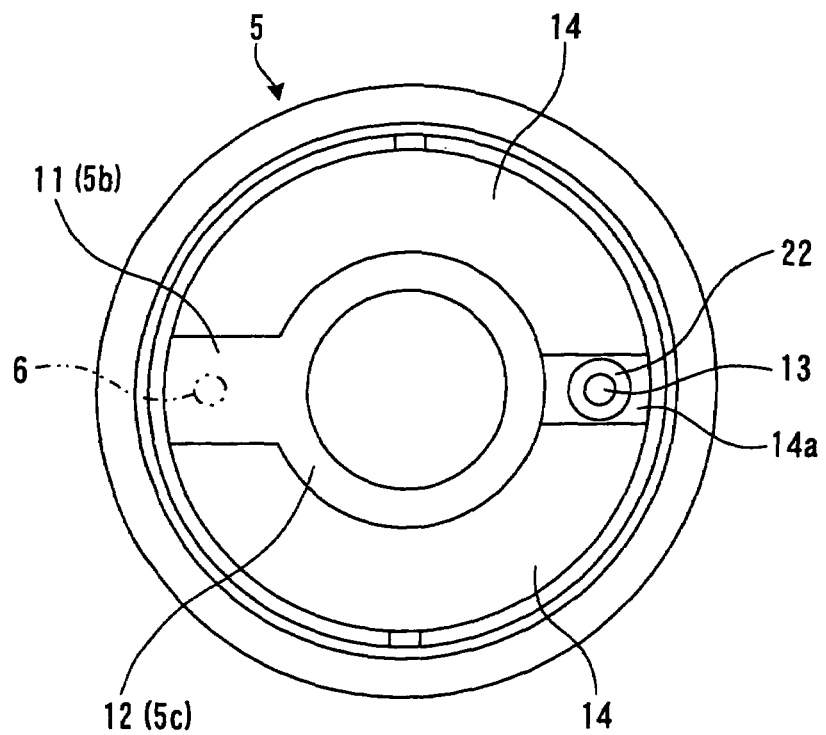
FIG. 9 is a view of a cover of a hydrodynamic bearing device according to another embodiment of the invention seen from the inside surface.
Figure 10A:
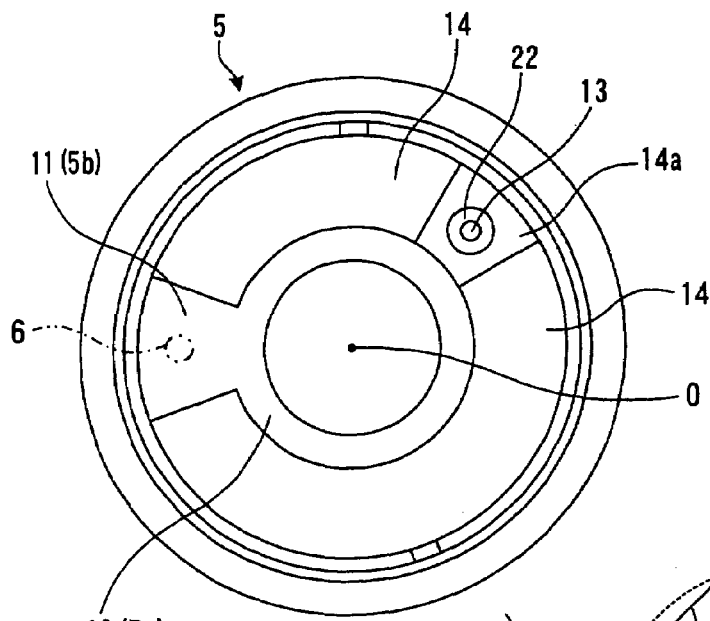
FIG. 10A is a view of a cover of the hydrodynamic bearing device according to another embodiment of the invention seen from the inside surface.
Figure 11:
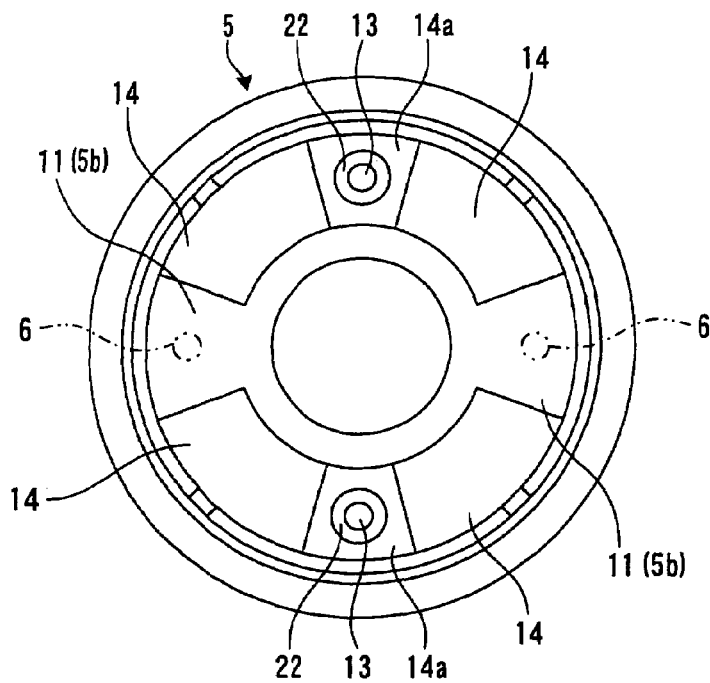
FIG. 11 is a view of a cover of a hydrodynamic bearing device according to another embodiment of the invention seen from the inside surface.
Figure 12:
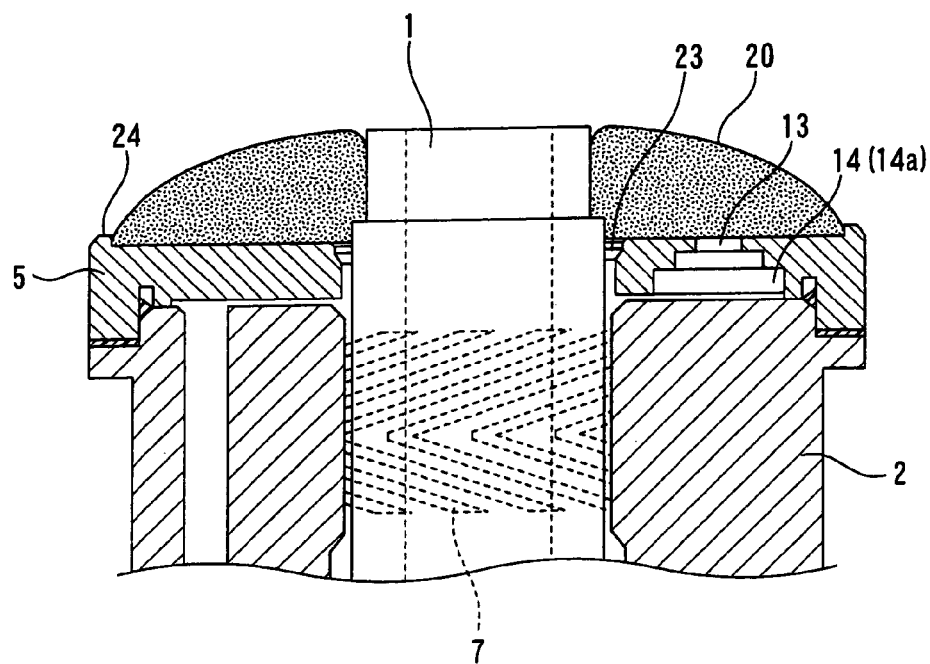
FIG. 12 is an upper cross sectional view of a hydrodynamic bearing device according to another embodiment of the invention.

In the first embodiment, as shown in FIG. 4A, a case in which the shape of the introducing minimum clearance 11 and the maximum space 14a of the fluid storage space 14 is formed into a fan shape when seen planar is described, but is not limited thereto, and as shown in FIG. 9, may be formed into a shape in which the boundaries in the circumferential direction are parallel to each other. As shown in FIG. 10A, the introducing minimum clearance 11 and the fluid storage space 14 may not be formed on opposite positions with respect to the point of bearing axis O, and further, as shown in FIG. 11, the communicating path 6 and the introducing minimum clearance 11, and the vent hole 13 and the maximum space 14a may be arranged at two or more locations.

Figure 4B:
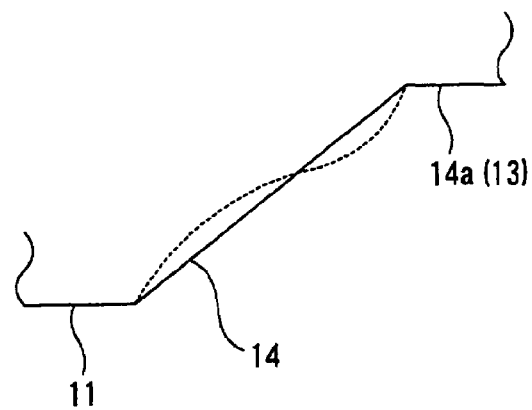
FIG. 4B is a view showing the extent of inclination with respect to a circumferential direction of a fluid storage space of the hydrodynamic bearing device.
Figure 5:
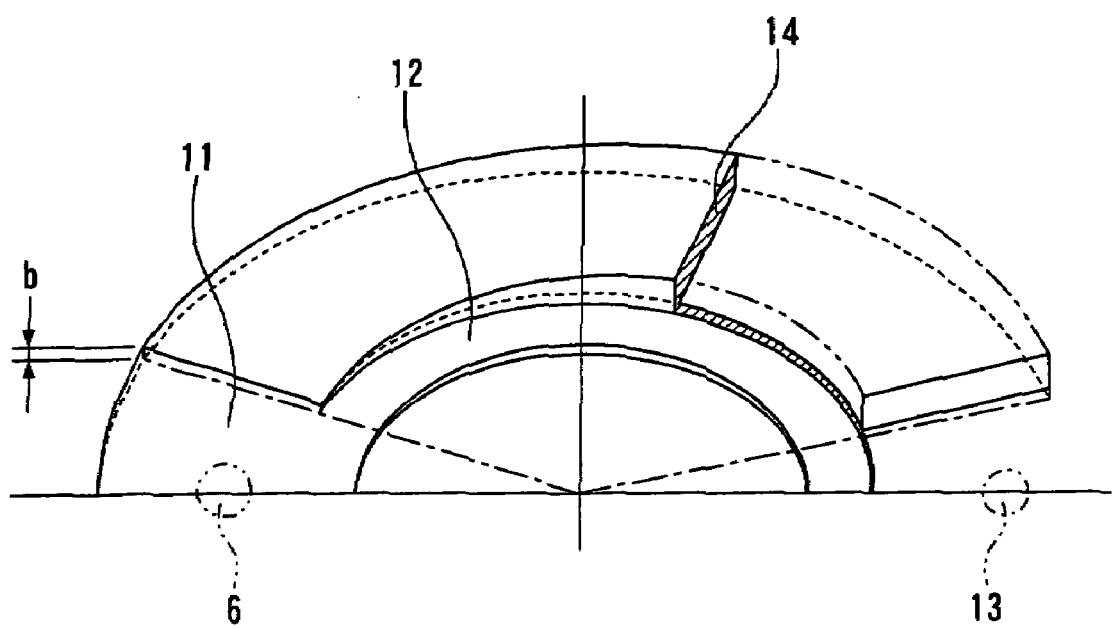
FIG. 5 is a perspective view schematically showing a separating space of a inside surface part of the cover and an upper end face of the sleeve facing thereto of the hydrodynamic bearing device.
Figure 10B:
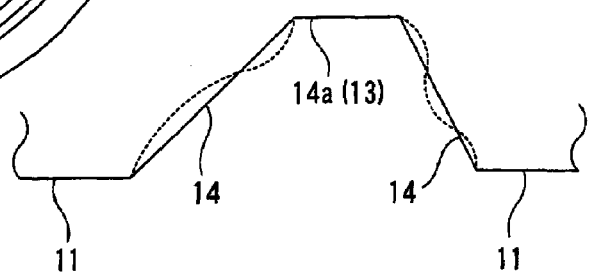
FIG. 10B is a view showing the extent of inclination with respect to the circumferential direction of the fluid storage space of the hydrodynamic bearing device.

The inclining angle with respect to the circumferential direction of the fluid storage space 14 may be constant as shown schematically in FIG. 4B and FIG. 10B, but is not limited thereto, and may be configured so that the middle part has a small inclining angle as shown with a dotted line, or may be formed into other shapes. Only a condition of forming into a shape inclined with respect to the circumferential direction so that the separating distance from the end face of the open end side of the sleeve becomes larger toward the vent hole 13 from the introducing minimum clearance 11 needs to be satisfied.

Figure 14A:
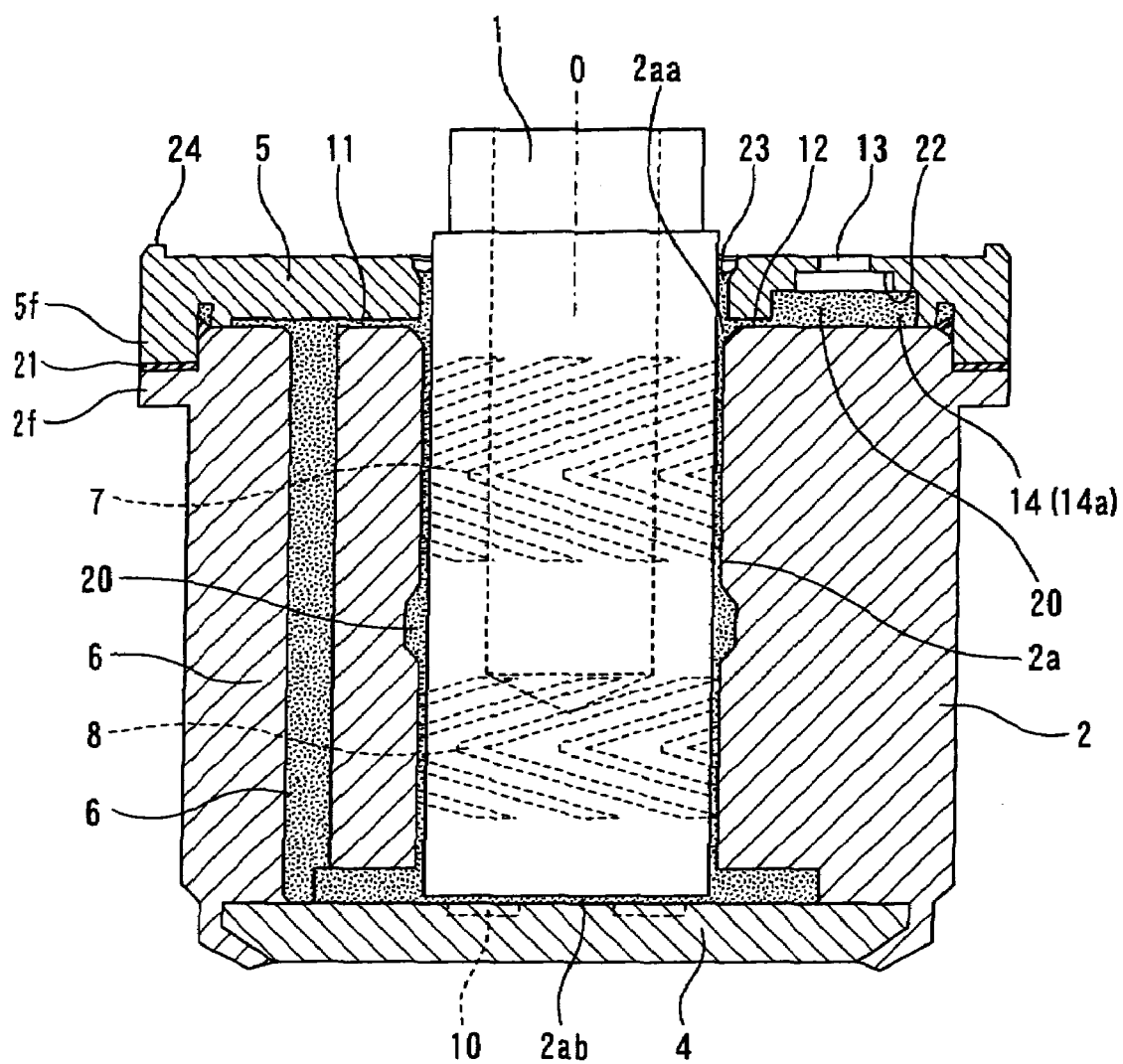
FIGS. 14A and 14B are cross sectional views of a hydrodynamic bearing device according to another embodiment of the invention.

In the first embodiment, a case of including a thrust flange 3 of thick diameter at the lower end of the shaft 1, a so-called shaft with flange is described, but is not limited thereto, and as shown in FIG. 14A, it is also applicable to a configuration in which the thrust flange 3 is not arranged and the dynamic pressure generating groove for the thrust hydrodynamic bearing is formed on at least one of the opposing surfaces of the lower end of the shaft 1 and the thrust plate 4, or to a configuration, not shown, in which the thrust flange 3 is not arranged, and a pivot part is arranged at the lower end part of the shaft 1 so as to be position regulated in the thrust direction with respect to a plate member that closes the close region. Similar advantages are of course also obtained in the above configuration or in a so-called flangeless shaft.

Figure 14B:
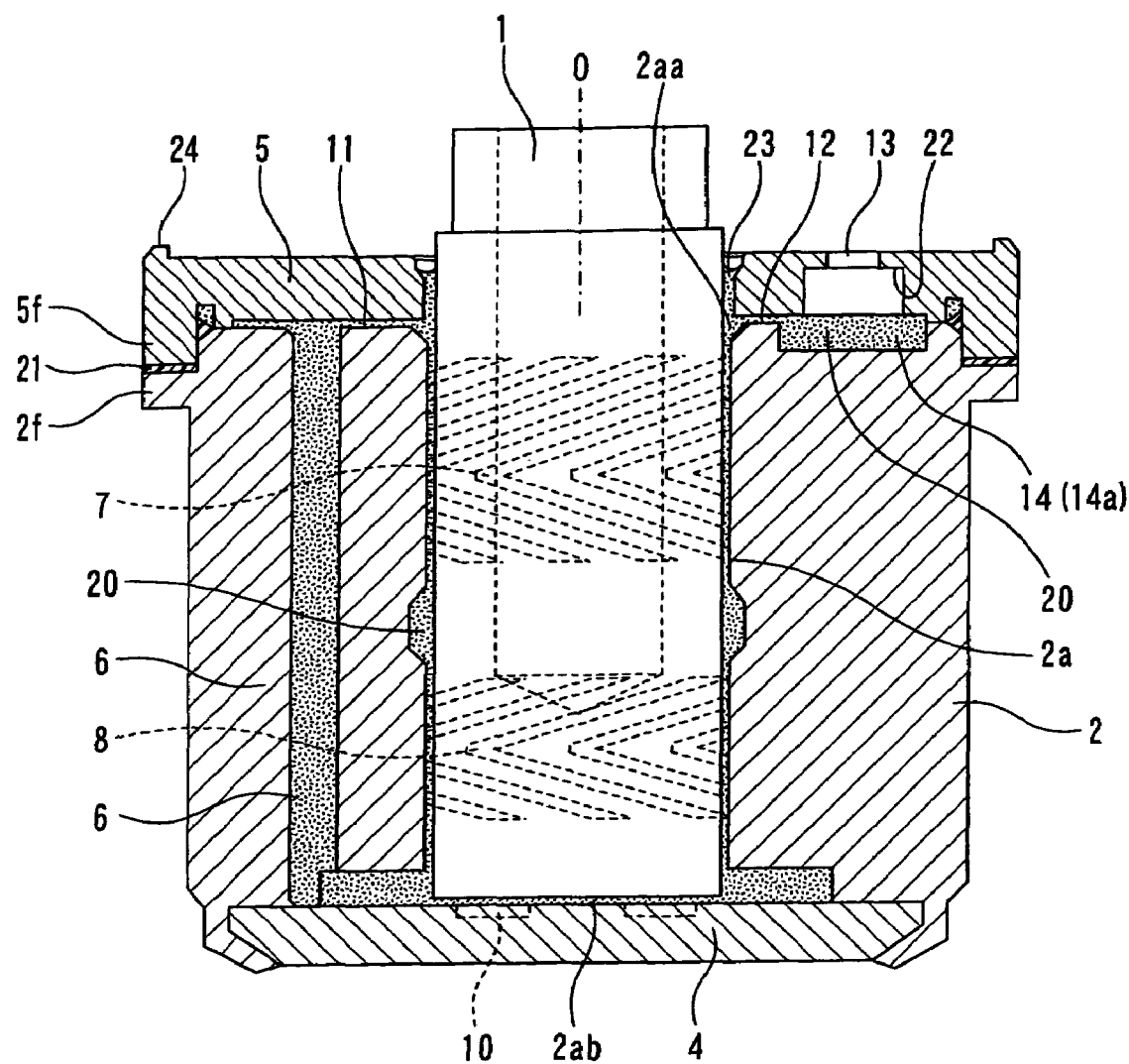

In the first embodiment, the fluid storage space 14 is formed on the cover 5 as shown in FIG. 14B, but similar advantages are also obtained even when formed on the end face on the open end side of the sleeve 2.

Second Embodiment

A hydrodynamic bearing device of a configuration different from the hydrodynamic bearing device of the first embodiment described above will now be described. In the following description, a case in which the open end of the bearing hole of the sleeve is arranged upward and the close end is arranged downward, as shown in FIG. 15B, is explained for easy understanding, but the orientation of arrangement is not limited thereto.

Figure 15A:
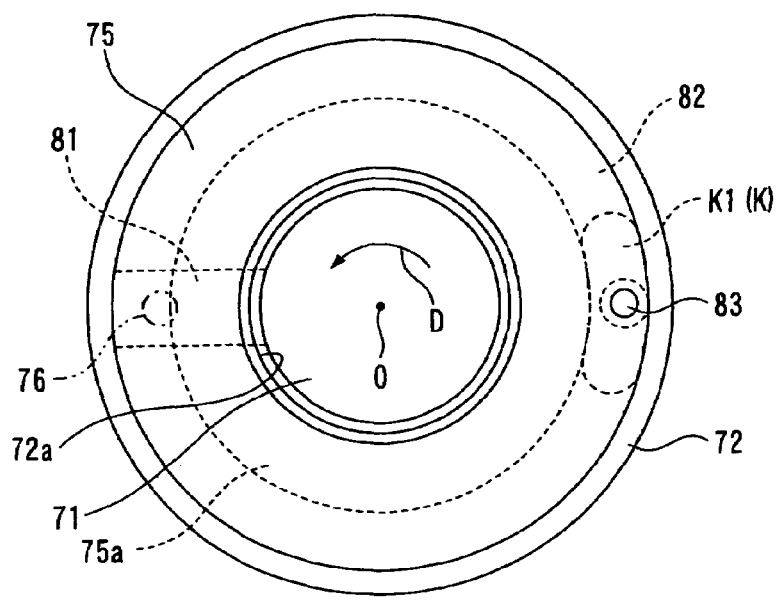
FIG. 15A is a plan view of a hydrodynamic bearing device according to a second embodiment of the invention.
Figure 15B:
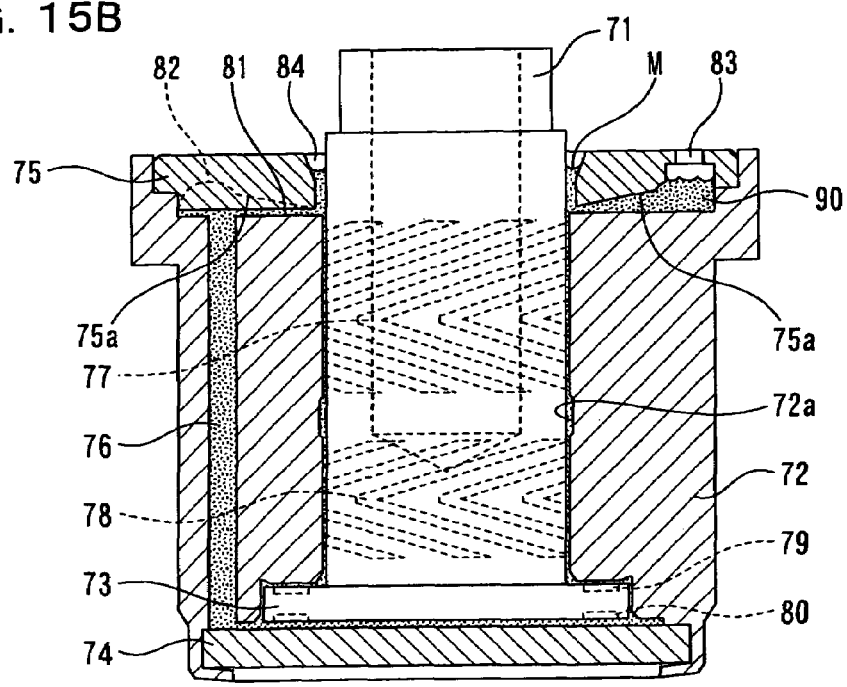
FIG. 15B is a cross sectional view of the hydrodynamic bearing device according to the second embodiment of the invention.

As shown in FIGS. 15A and 15B, the hydrodynamic bearing device includes, in addition to a configuration including a shaft 71, a sleeve 72 including a bearing hole 72a with an open end on the upper side that opens and a close end on the lower side that is closed and having the shaft 71 inserted therein in a freely rotating orientation with a gap (space) in between, a thrust flange 73 of thick diameter arranged on the one end part (lower end part in FIG. 15B) of the shaft 71 and arranged in an orientation that includes a gap with respect to the end face on the lower end part side of the sleeve 72, and a thrust plate 74 fixed at the bottom part of the sleeve 72 so as to face the thrust flange 73 in an orientation that includes the gap in between, a cover 75, that includes a vent hole 83 leading to outside air at one part, for covering the upper end face (end face on the open end side) of the sleeve 72 with a clearance in between. In the hydrodynamic bearing device, one communicating path 76 that extends parallel to the bearing axis is perforated at the location closer to the outer peripheral surface of the sleeve 72. The communicating path 76 communicates the space region (space region on the close end face side) to where the upper surface of the thrust plate 74 faces and the space region between the cover 75 and the upper end face of the sleeve 72. The operating fluid 90 such as, lubricating oil is filled into the internal space surrounded by the sleeve 72 covered with the cover 75 and the thrust plate 74 (i.e., gap space between the outer peripheral surface of the shaft 71 and the inner peripheral surface of the sleeve 72, the gap space between the thrust flange 73 and the lower surface of the sleeve 72 facing thereto and the inner peripheral surface of thick diameter in the proximity thereof, the gap space between the thrust flange 73 and the thrust plate 74, the space within the communicating path 76, and space between the upper end face of the sleeve 72 and the cover 75

(excluding location of vent hole). Reference character 84 of FIG. 15B is the operating fluid storing part, formed so as to become wider toward the opening side on the inner peripheral surface of the cover 75 facing the shaft 71, for storing the operating fluid 90 in communication with the outside air.

Figure 15C:
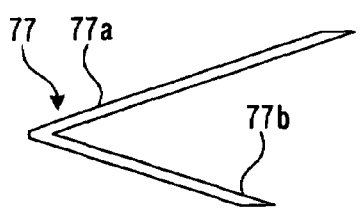
FIG. 15C is a view showing one dynamic pressure generating groove of the hydrodynamic bearing device.

Two dynamic pressure generating grooves 77 and 78 are formed one over the other on the inner peripheral surface of the sleeve 72 (or on outer peripheral surface of the shaft 71 or on both the inner peripheral surface of the sleeve 72 and the outer peripheral surface of the shaft 71) and the radial hydrodynamic bearing is configured in which, when the shaft 71 and the sleeve 72 are relatively rotated by the motor rotational driving force not shown, the shaft 71 and the sleeve 72 are supported in a freely supporting manner through a predetermined gap in the radial direction (direction of radius) by the force of the operating fluid 90 collected by the dynamic pressure generating grooves 77 and 78. The dynamic pressure generating grooves 79 and 80 are formed on the upper surface and the lower surface of the thrust flange 73 (or on the lower surface of the sleeve 72 or the upper surface of the thrust plate 74 facing thereto, or on all of the upper and lower surfaces of the thrust flange 73 and the lower surface of the sleeve 72 and the upper surface of the thrust plate 74) and the thrust hydrodynamic bearing is configured in which, when the thrust flange 73 attached to the shaft 71 and the sleeve 72 are relatively rotated by the motor rotational driving force, the thrust flange 73 and the sleeve 72 and the thrust plate 74 are supported in a freely supporting manner through a predetermined gap in the thrust direction (direction of bearing axis) by the force of the operating fluid 90 collected by the dynamic pressure generating grooves 79 and 80. The dynamic pressure generating grooves 77 and 78 configuring the radial hydrodynamic bearing are formed into a well-known herringbone shape, and are formed at a total of two locations on the upper side and the lower side of the outer peripheral surface of the shaft 71. The dynamic pressure generating groove 78 on the lower side has the groove inclined upward from the vertex thereof and the groove inclined downward made into the same length whereas the dynamic pressure generating groove 77 on the upper side has the groove 77a inclined upward from the vertex thereof made longer than the groove 77b inclined downward from the vertex as shown in FIG. 15C. During rotational drive, the operating fluid 90 in the clearance is actively sent out downward by the dynamic pressure generating groove 77 on the upper side.

Figure 16:
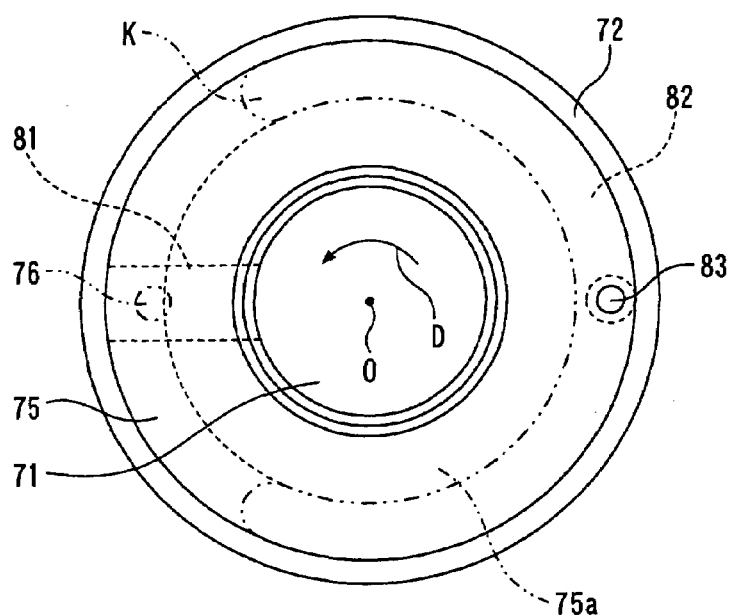
FIG. 16 is a plan view of the hydrodynamic bearing device.
Figure 17:
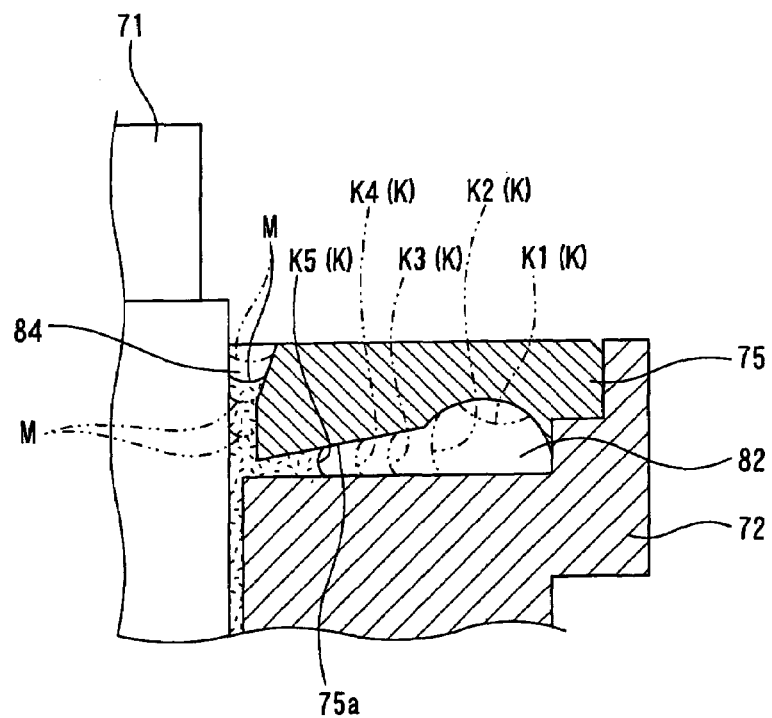
FIG. 17 is an enlarged cross sectional view of a fluid storage space and a location in the proximity thereof of the hydrodynamic bearing device.

The upper end face facing the cover 75 on the sleeve 72 is planar in shape. On the other hand, the cover 75 has the inside surface part (surface facing the upper end face of the sleeve 72) arranged so that the clearance (referred to as introducing minimum clearance part 81) that allows the fluid to flow into the bearing hole 72a of the inner peripheral surface of the sleeve 72 by the capillary phenomenon is formed at a region in the proximity of the opening of the communicating path 76 that opens to the upper end face of the sleeve 72. The introducing minimum clearance part 81, as shown in FIG. 16 and FIG. 17, is formed so as to continue from the location in the proximity of the opening of the communicating path 76 to the open end of the bearing hole 72a of the sleeve 72. The location other than the introducing minimum clearance part 81 at the inside surface of the cover 75 is formed into a depressed shape so that a fluid storage space 82 in which the location closer to the outer periphery is greatly depressed upward is formed, as shown with a dotted line in FIG. 15B. An inclined surface 75a depressed so as to be inclined in such a way that the clearance with the upper end face of the sleeve 72 gradually decreases from the fluid storage space 82 toward the center side in the direction of the radius is formed. The locations facing the fluid storage space 82 and the inclined surface 75a are formed into a relatively large dimension that does not cause capillary phenomenon to store the operating fluid 90. At the locations opposite the opening of the communicating path 76 with the bearing axis O as the center of the cover 75 when seen planar, a vent hole 83 that communicates to the outside air is arranged. Reference character D in FIG. 16 is the rotating direction of the shaft 71.

In this configuration, when the shaft 71 and the sleeve 72 are relatively rotated by the motor rotational driving force and the like not shown, the shaft 71 is supported with respect to the sleeve 72 with a predetermined gap in between by the force of the operating fluid 90 collected by the dynamic pressure generating grooves 77 and 78 of the radial hydrodynamic bearing and the force of the operating fluid 90 collected by the dynamic pressure generating grooves 79 and 80 of the thrust hydrodynamic bearing. Further, due to the force of the operating fluid 90 collected by the dynamic pressure generating grooves 77 on the upper side of the radial hydrodynamic bearing, the operating fluid 90 between the shaft 71 and the sleeve 72 is fed downward, and accompanied therewith, the operating fluid 90 passes through the space between the thrust flange 73 and the sleeve 72, the space between the sleeve 72 and the thrust plate 74, the space within the communicating path 76, and the introducing minimum clearance part 81 in such order, and again flows into the space between the shaft 71 and the sleeve 72 and thus the operating fluid 90 is actively circulated through theses spaces. Further, one part of the operating fluid 90 introduced into the introducing minimum clearance part 81 from the communicating path 76 again flows into the space between the shaft 71 and the sleeve 72 while also flowing into the fluid storage space 82.

Therefore, even if the air bubbles are attached to the dynamic pressure generating grooves 77 and 78 of the radial hydrodynamic bearing or the dynamic pressure generating grooves 79 and 80 of the thrust hydrodynamic bearing, the air bubbles break away from the dynamic pressure generating grooves 77 and 78 and the dynamic pressure generating grooves 79 and 80 and circulate through the circulation flow, and when flowing into the fluid storage space 82 from the communicating path 76 through the introducing minimum clearance part 81, are separated from the operating fluid and exhausted from the vent hole 83. Thus, according to this configuration, the air bubbles in the operating fluid are exhausted even during the normal rotational drive, and as a result, lowering of bearing performance such as, lowering of bearing stiffness due to the air bubbles and instability of the rotation during rotating operation can be prevented.

According to such hydrodynamic bearing device, not only is the operating fluid storing part 84 arranged on the inner peripheral surface of the cover 75 facing the shaft 71, but the fluid storage space 82 of large volume is also arranged between the sleeve 72 and the cover 75. Therefore, when the operating fluid of the fluid storage space 82 decreases due to evaporation and the like, the interface K of the operating fluid with respect to the air first shapes into a substantially circular arc loop shape along the fluid storage space 82, as shown with a dotted line in FIG. 15A. Even if the operating fluid is further decreased, the interface K has a shape along the inclined surface 75a. In the unlikely event of the operating fluid of the fluid storage space 82 decreasing and becoming non-existent due to evaporation and the like, the circulating function is maintained as long as the introducing minimum clearance part 81 is filled with operating fluid, and thus the bearing performance can be satisfactorily maintained over an extremely long period of time, and longer life time is realized.

What is claimed is:

1. A hydrodynamic bearing device comprising:
a shaft;
a sleeve including a bearing hole with an open end that opens and a close end that is closed, the shaft being inserted into the bearing hole for freely rotating with a predetermined gap in between; and
a cover for covering an end face on the open end of the sleeve,
a dynamic pressure generating groove formed on at least one of an outer peripheral surface of the shaft and an inner peripheral surface of the sleeve where the shaft and the sleeve face each other, said dynamic pressure generating groove supporting the shaft with respect to the sleeve in a relatively rotatable fashion in a radial direction in a non-contacting manner,
a communicating path formed in the sleeve, for communicating a space region on the close end face of the sleeve and a space region between the cover and the end face on the open end of the sleeve, and
an operating fluid being filled into a space in the sleeve including a space between the cover and the sleeve, whereby when the shaft is relatively rotated with respect to the sleeve, the operating fluid is circulated through a space between the shaft and the sleeve, said space region on the close end side leading to the space between the shaft and the sleeve, said communicating path leading to the space region on the close end side, and the space between the cover and the sleeve leading to the communicating path, wherein
an introducing minimum clearance for causing capillary phenomenon is formed to extend to the open end of the bearing hole from a location in a proximity of the opening of the communicating path between the cover and the end face on the open end of the sleeve, so that the operating fluid from the communicating path flows into the bearing hole due to the capillary phenomenon,
a vent hole leading to an outside air is formed at a location not formed with the introducing minimum clearance of the cover, and
a fluid storage space for storing the operating fluid is formed by being depressed so as to become a space larger than the clearance of the introducing minimum clearance at an inside surface of the cover facing the end face on the open end of the sleeve or at the end face on the open end of the sleeve, thereby to communicate the introducing minimum clearance and the vent hole in the circumferential direction.

2. The hydrodynamic bearing device according to claim 1, wherein the fluid storage space is formed into a shape that inclines with respect to the circumferential direction so that a separating distance from the end face on the open end of the sleeve becomes larger from the introducing minimum clearance toward the vent hole.

3. The hydrodynamic bearing device according to claim 1, wherein
a bearing hole outer periphery minimum clearance for causing capillary phenomenon is formed on the outer periphery in a proximity of the open end of the bearing hole in between the inside surface of the cover and the end face on the open end of the sleeve,
the introducing minimum clearance is connected to the bearing hole outer periphery minimum clearance, and the operating fluid sent out from the communicating path flows into the bearing hole by the capillary phenomenon via the introducing minimum clearance and the bearing hole outer periphery minimum clearance.

4. The hydrodynamic bearing device according to claim 1, wherein
an operating fluid storing part for storing the operating fluid in communication with the outside air is formed on the inner peripheral surface facing the shaft of the cover, the operating fluid storing part including an inclined surface that inclines so that an inner diameter of the cover becomes larger as the distance from the end face on the open end of the sleeve becomes larger, and
the operating fluid storing part is formed into a shape in which a surface tension of the operating fluid stored in the operating fluid storing part and a surface tension of the operating fluid facing the vent hole are substantially balanced.

5. The hydrodynamic bearing device according to claim 1, wherein
an operating fluid storing part for storing the operating fluid in communication with the outside air is formed on the outer peripheral surface of the shaft facing the inner peripheral surface of the cover, the operating fluid storing part including an inclined surface that inclines so that an outer diameter of the shaft becomes smaller as the distance from the end face on the open end of the sleeve becomes larger, and
the operating fluid storing part is formed into a shape in which a surface tension of the operating fluid stored in the operating fluid storing part and a surface tension of the operating fluid facing the vent hole are substantially balanced.

6. The hydrodynamic bearing device according to claim 1, wherein an operating fluid storing part for storing the operating fluid in communication with the outside air is formed on the inner peripheral surface facing the shaft of the cover, the operating fluid storing part being formed so as to be inclined with the inner diameter of the cover becoming larger and the outer diameter of the shaft becoming smaller as the distance from the end face on the open end of the sleeve becomes larger, and having at least one part of the inclined surface formed on the outer peripheral surface of the shaft facing a range of thickness in the axial direction of the cover.

7. The hydrodynamic bearing device according to claim 1, wherein an interval of the introducing minimum clearance becomes smaller from the location in a proximity of the opening of the communicating path toward the open end of the bearing hole.

8. The hydrodynamic bearing device according to claim 1, wherein the space region on the close end face side of the sleeve is a space region where a thrust flange fixed to a distal end of the shaft is arranged, and the opening of the communicating path arranged on the close end face of the sleeve is connected to the space where the thrust flange is arranged.

9. The hydrodynamic bearing device according to claim 1, wherein the space region on the close end face of the sleeve is a space region formed by a distal end of the shaft and a close end face region close plate, and the opening of the communicating path arranged on the close end face of the sleeve is connected to the space where the distal end of the shaft faces.

10. The hydrodynamic bearing device according to claim 1, wherein the radial dynamic pressure generating groove is formed into a shape that applies circulating force to the operating fluid.

11. The hydrodynamic bearing device according to claim 1, wherein the vent hole is formed at a position substantially point symmetric to the communicating hole with respect to the center of the shaft.

12. The hydrodynamic bearing device according to claim 1, wherein the end face of the sleeve and the inner surface of the cover are substantially parallel so that the introducing minimum clearance maintains a constant clearance in the proximity of the opening of the communicating path.

13. The hydrodynamic bearing device according to claim 1, wherein a space larger than a space where lubricating agent flows in by the capillary phenomenon is formed in a proximity of the vent hole.

14. The hydrodynamic bearing device according to claim 13, wherein the space larger than the space where the lubricating agent flows in by the capillary phenomenon is a tubular space having a diameter larger than the vent hole.

15. The hydrodynamic bearing device according to claim 1, which is used in a spindle motor.

* * * * *